US010458172B2

(12) United States Patent
Okrasa et al.

(10) Patent No.: US 10,458,172 B2
(45) Date of Patent: Oct. 29, 2019

(54) TELESCOPING DOOR OPENER

(71) Applicants: Matthew Stefan Okrasa, Ajax (CA); Steven Clare Dawson, Collingwood (CA)

(72) Inventors: Matthew Stefan Okrasa, Ajax (CA); Steven Clare Dawson, Collingwood (CA)

(*) Notice: Subject to any disclaimer, the term of this patent is extended or adjusted under 35 U.S.C. 154(b) by 181 days.

(21) Appl. No.: 15/589,448

(22) Filed: May 8, 2017

(65) Prior Publication Data

US 2017/0321467 A1 Nov. 9, 2017

Related U.S. Application Data

(60) Provisional application No. 62/333,503, filed on May 9, 2016.

(51) Int. Cl.
*E05F 15/00* (2015.01)
*E05F 15/59* (2015.01)
*F16H 19/00* (2006.01)

(52) U.S. Cl.
CPC .......... *E05F 15/59* (2015.01); *F16H 19/006* (2013.01); *E05Y 2900/106* (2013.01)

(58) Field of Classification Search
CPC ......... E05F 15/59; E05F 15/686; E05F 15/47; E05F 15/681; E05F 15/684; E05F 15/50; E05F 15/57; E05F 15/51; E05F 15/53; E05F 15/56; E05Y 2900/106; F16H 19/006; F16H 19/02; F16H 35/18

See application file for complete search history.

(56) References Cited

U.S. PATENT DOCUMENTS

| 3,349,516 | A | * | 10/1967 | Armstrong | E05F 15/59 49/199 |
|---|---|---|---|---|---|
| 4,102,382 | A | * | 7/1978 | Vesbach | E05F 15/59 160/188 |
| 4,597,224 | A | | 7/1986 | Tucker | |
| 4,653,565 | A | | 3/1987 | Iha et al. | |
| 5,240,349 | A | * | 8/1993 | Kennedy | E05F 5/12 405/132 |
| 6,983,785 | B2 | * | 1/2006 | Altimore | E05D 13/1238 16/72 |
| 8,590,209 | B1 | * | 11/2013 | Skotty | E05D 13/12 49/197 |

(Continued)

*Primary Examiner* — Beth A Stephan

(57) ABSTRACT

The present invention is a door opener operable to open doors of various weights, heights and widths, comprising cables attached to the door and further attached to an operation unit. The operation unit incorporates a telescoping section driven to extend and compress by the function of a fluid pump. The telescoping section comprises two or more telescoping portions. The extension of at least one telescoping portion creates tension in the cables and causes the door to be moved from a closed or semi-closed position to an open or semi-open position. The compression of at least one telescoping portion reduces tension in a constant or near-constant manner so that the door is caused to move from an open or semi-open position to a closed position or semi-closed position. The pump only requires power while at least one telescoping portion is extending and therefore power is only required while the door is being moved towards an open position.

20 Claims, 26 Drawing Sheets

(56) References Cited

U.S. PATENT DOCUMENTS

| | | | |
|---|---|---|---|
| 8,627,871 B2 * | 1/2014 | Aquilina | E05F 15/59 |
| | | | 160/188 |
| 9,091,107 B2 * | 7/2015 | Betker | E05D 15/38 |
| 2008/0047672 A1 | 2/2008 | Gorman | |
| 2012/0260575 A1 | 10/2012 | Monaco | |
| 2015/0007500 A1 | 1/2015 | Schatz et al. | |

* cited by examiner

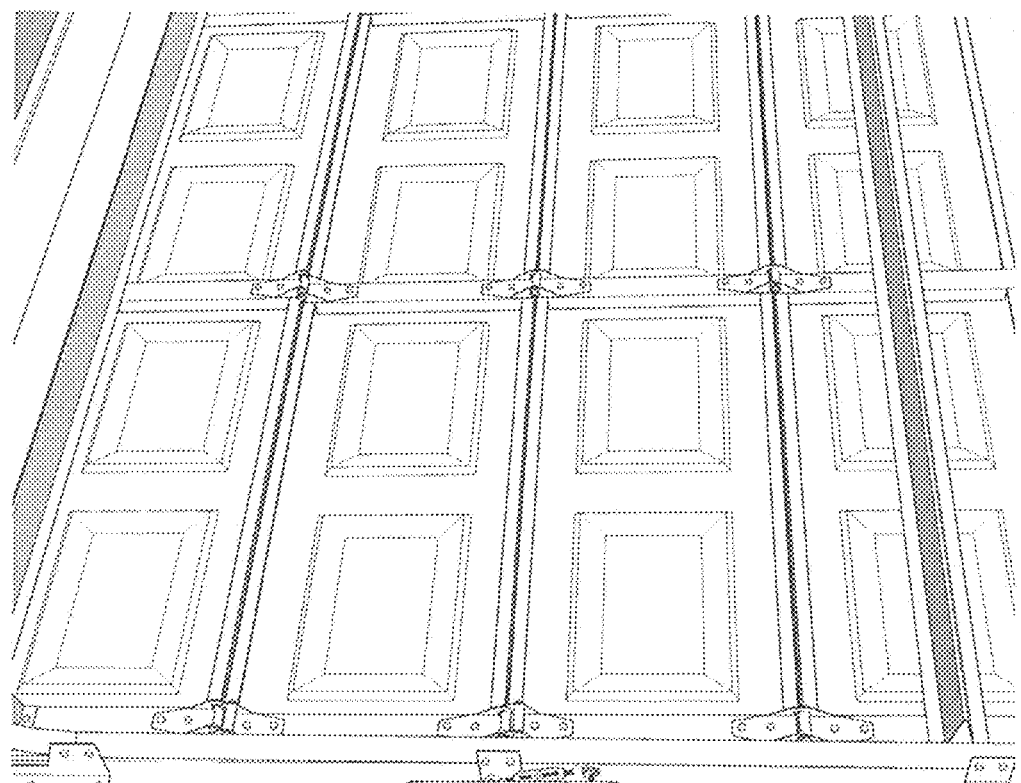
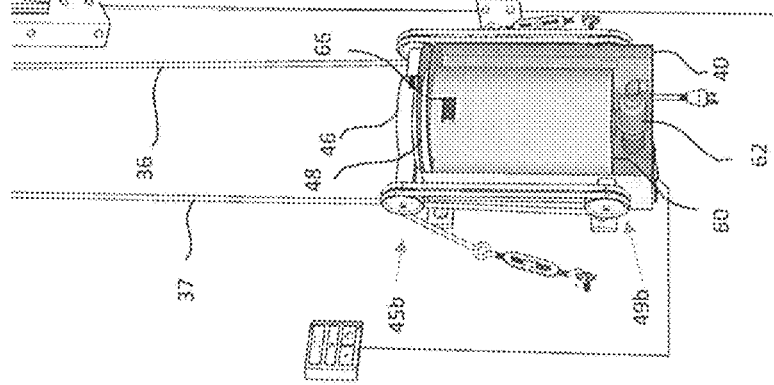
FIG. 8

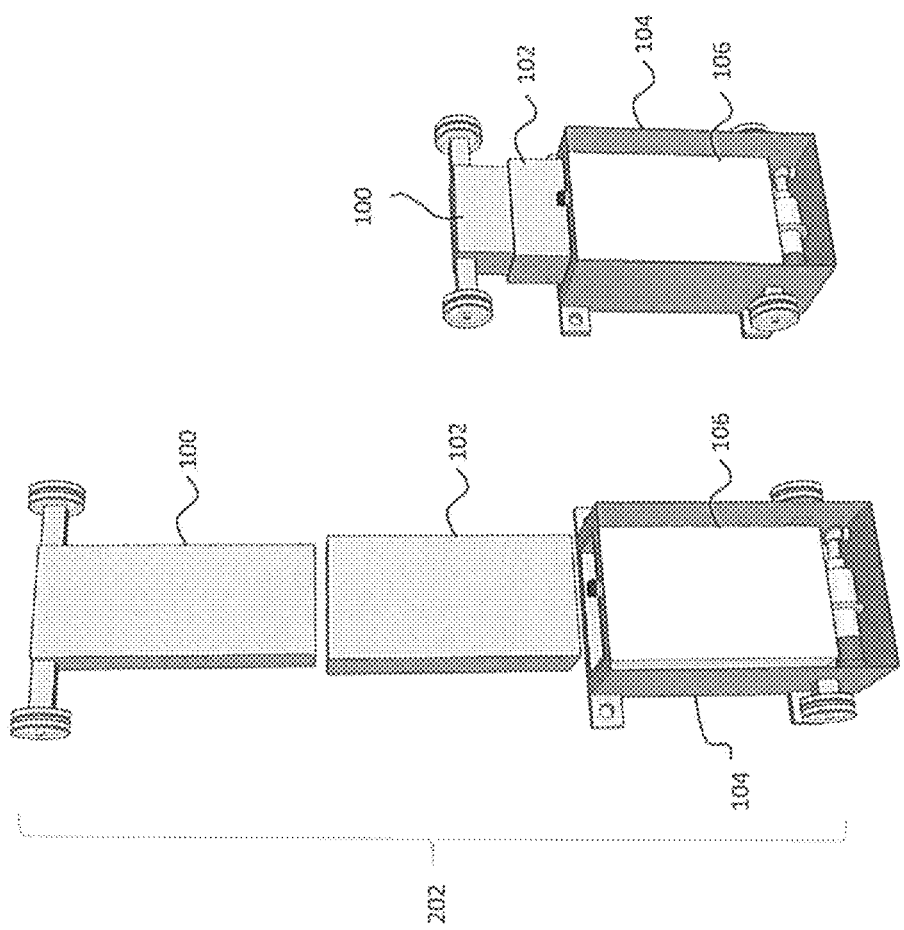

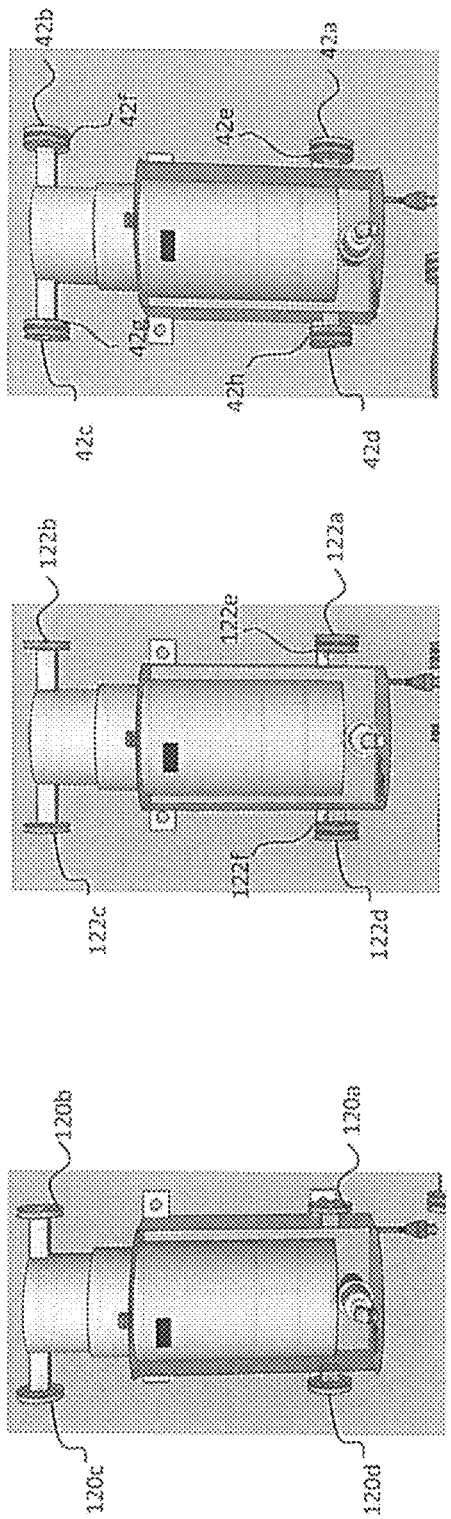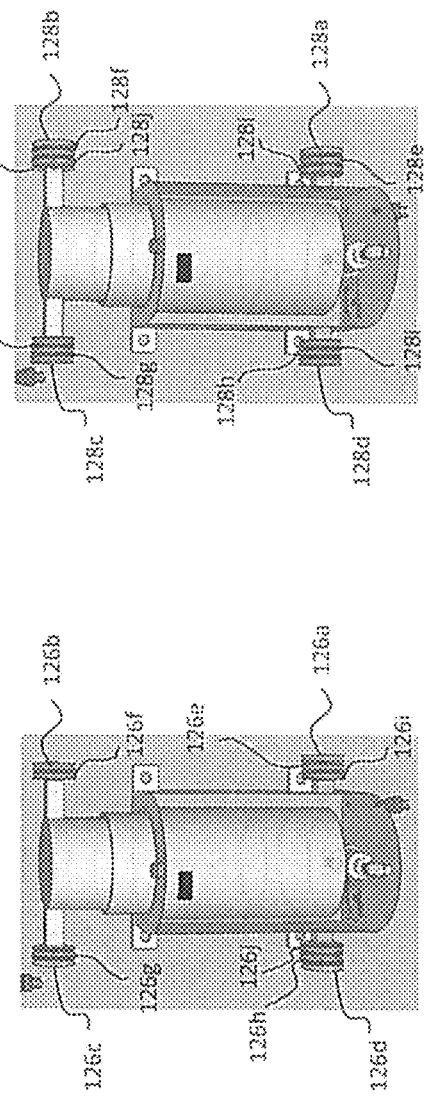
FIG. 23
FIG. 24
FIG. 25
FIG. 26
FIG. 27

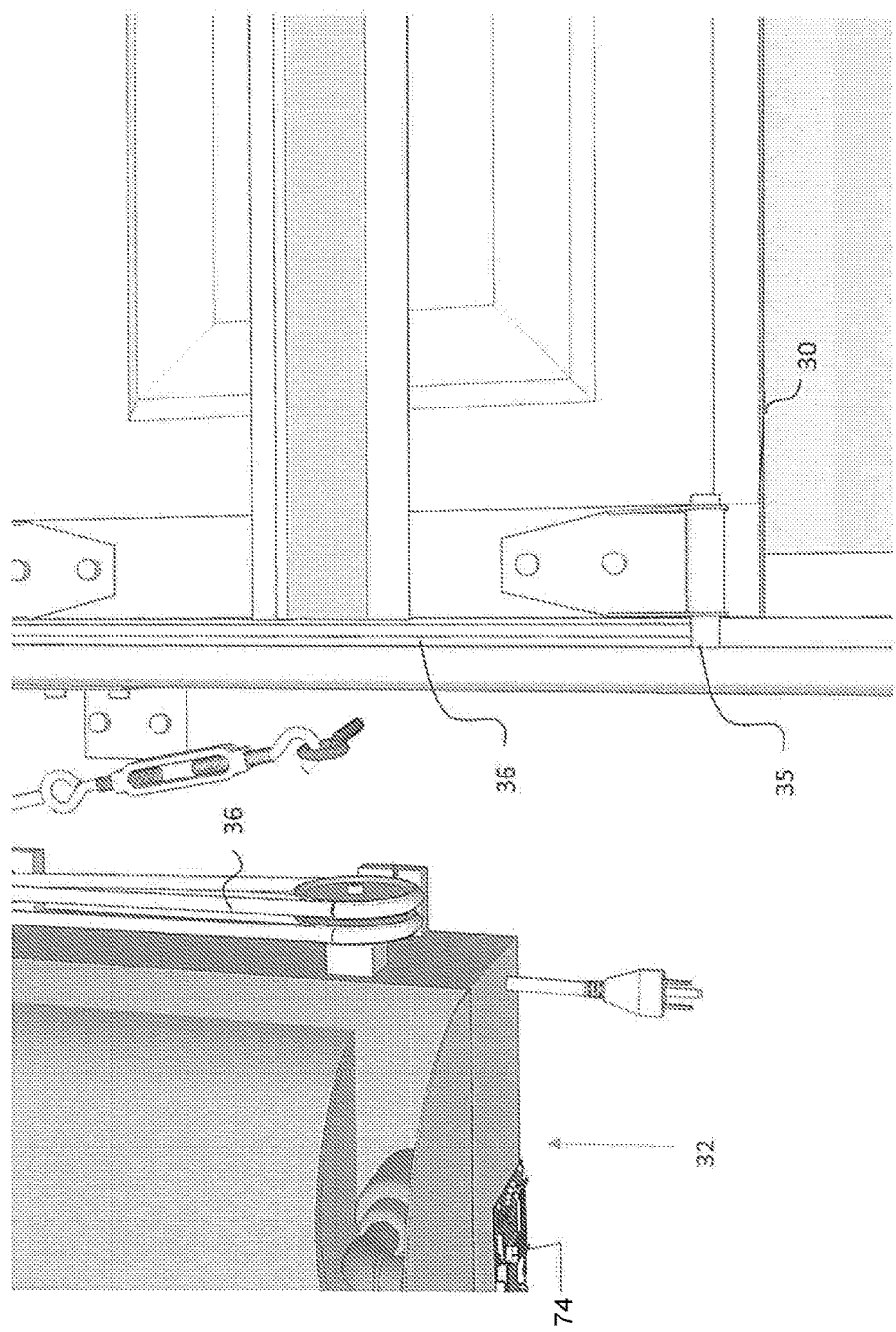

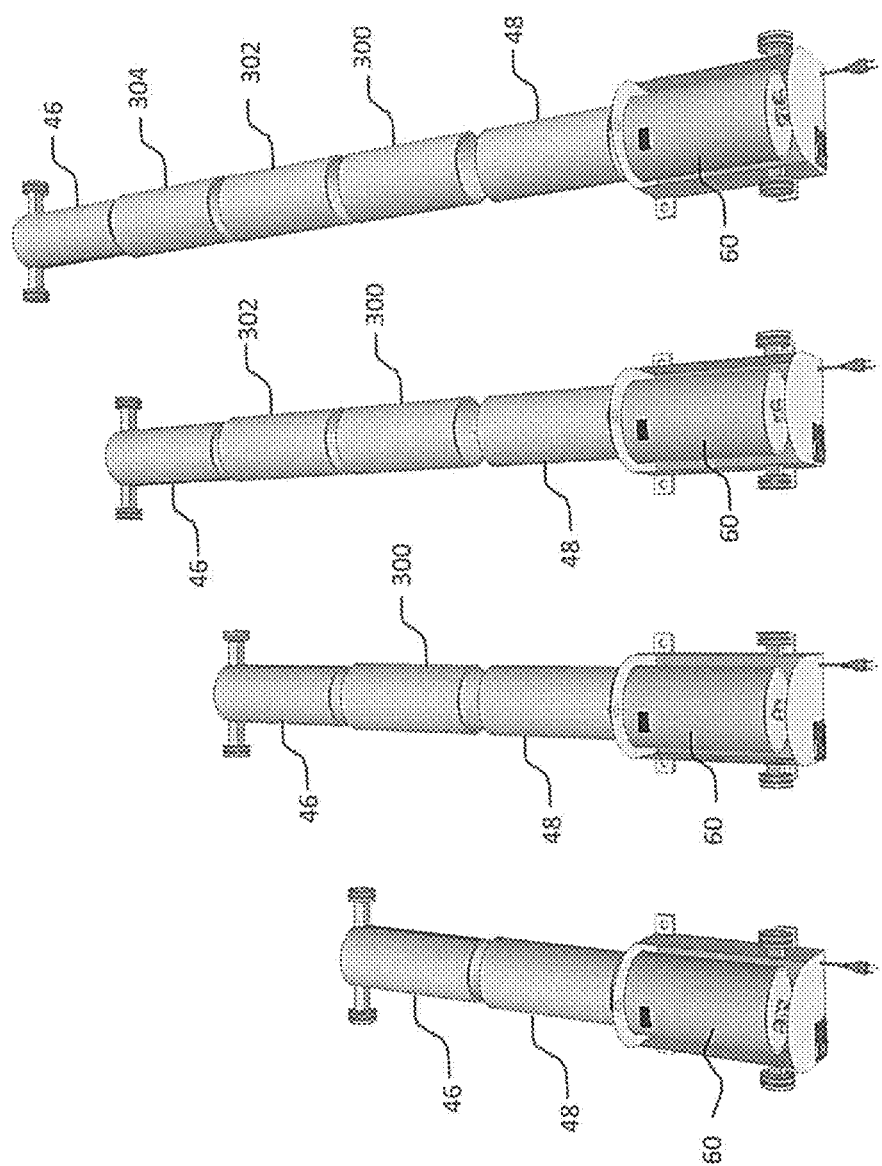

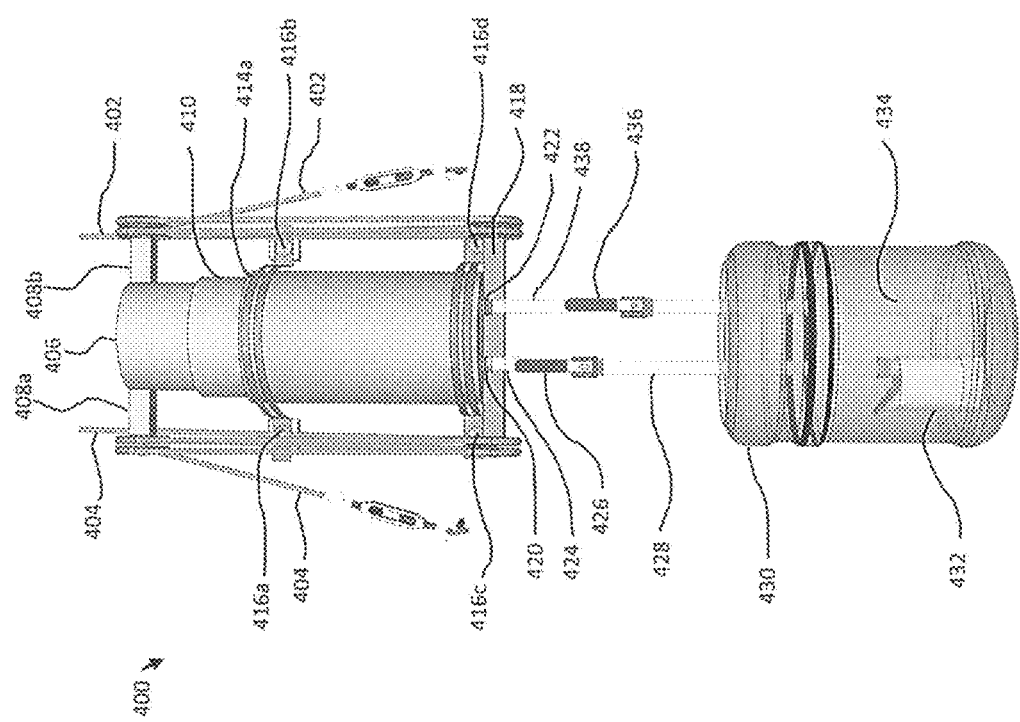

TELESCOPING DOOR OPENER

This application claims the benefit of U.S. Provisional Patent Application Ser. No. 62/333,503 filed May 9, 2016.

FIELD OF INVENTION

This invention relates in general to the field of a door opener for moving a door between an open and closed position and more particularly to a door opener driven by a fluid pump.

BACKGROUND OF THE INVENTION

Garage door openers of the type mounted on the ceiling of a garage are commonly known. Typically overhead garage door openers incorporate a belt or chain drive that is operated to move a garage door into the open and closed position.

For example, U.S. Pat. No. 4,653,565 issued on Mar. 31, 1987 to Chamberlain Manufacturing Corporation (filed as U.S. patent application Ser. No. 758,822 on Jul. 25, 1985) discloses a garage door opener having an arm connected to the garage door. The arm is further connected to a cable drive system and a track, both of which are positioned along the ceiling extending from near the top of the garage door. The cable drive system is motorized and causes the arm to move along the track, an action that moves the garage door between an open and closed position. The arm connecting to the garage door extends below the ceiling mounted track into the garage when the garage door is opened As another example, U.S. Patent Application Publication No. 2008/0047672 filed on Aug. 27, 2007 by James Gorman and Theron Neeley (U.S. patent application Ser. No. 11/845,373) discloses a garage door opener having an arm connected to the garage door. The arm is further connected to a drive system and a track, both of which may be positioned along the ceiling extending from near the top of the garage door or along a wall of the garage. The drive system is powered and operated by an electric motor or a battery powered motor. The motor is activated by a switch, and when activated causes the arm to move along the track to move the garage door between an open and closed position. The arm connecting to the garage door extends even farther into the interior of the garage than the track when the garage door is opened.

As yet another example, U.S. Patent Application Publication No. 2012/0260575 filed on Apr. 12, 2011 by Pietro A. Monaco (U.S. patent application Ser. No. 13/084617) discloses a garage door opener having an arm connected to a garage door. The arm is further connected to a cable drive system and a track, both of which are positioned along the ceiling extending from near the top of the garage door. The drive system is powered and operated by an electric motor. The motor is activated by a control module that reacts to a switch or signal from a remote controller. When activated, the motor causes the arm to move along the track to move the garage door between an open and closed position. The arm connecting to the garage door extends into the garage below the ceiling mounted track when the garage door is opened.

Garage door openers that require a spring connection to assist with the opening and closing of a garage door are also known. For example, U.S. Pat. No. 4,597,224 issued on Jul. 1, 1986 to Derry E. Tucker (filed as U.S. patent application Ser. No. 576,211 on Feb. 2, 1984) discloses a garage door opener having spring connected cables that extend from the base of the garage door. The spring is connected to a chain and tension upon the chain causes an arm connected to the garage door to move along an overhead track to move the garage door between an open and closed position. This prior art requires a track to be positioned in the ceiling of the garage and the arm connecting to the garage door extends below the ceiling mounted track into the garage when the garage door is opened.

As yet another example, U.S. Patent Application Publication No. 2015/0007500 filed on Jun. 20, 2014 by Magna Closures Inc. (U.S. patent application Ser. No. 14/309996) discloses a garage door opener having a motor connected to the side wall of a garage and further connected to a drum and shaft extending above a garage door. A torsion spring integrated with the shaft driven by the motor arm causes the shaft to rotate and the drums positioned at either end of the shaft to wind or unwind cable from around the drums with the rotation of the shaft. The cable is connected to the garage door so that as the cable is wound around the drums the garage door is lifted to an open position and as the cable is unwound from the drums the garage door is moved to a closed position. This prior art requires that the motor be connected directly to the shaft element of the garage door opener. It also incorporates many parts to function.

Generally, known prior art garage door openers are either fully powered, so that power is required to both open and close the garage door, or fully manual so that the garage door is manually opened and closed.

SUMMARY OF THE INVENTION

In one aspect, the present disclosure relates to a door opener operable to move a door between an open and closed position, said door opener comprising: two or more cables connected to the door; an opener unit comprising: a receptacle having fluid therein; a telescoping section comprising two or more telescoping portions positioned at least partially within the receptacle; a fluid pump having an inlet/outlet port being connected to the telescoping section via a connection port; and a plurality of unit pulleys attached to either side of the uppermost telescoping section and to either side of the receptacle having the cables each wrapped around and between said unit pulleys on opposite sides; and a positioning system whereby the cables are positioned along a path between the door and the opener; and whereby the door is moved towards an open position when the fluid pump pumps the fluid from the receptacle to the telescoping section and the telescoping portions extend, and whereby the door is moved towards an closed position when the fluid pump is not in operation and fluid flows from the telescoping section to the receptacle and the telescoping portions collapse.

The present disclosure further relating to the door opener that further comprises a stopper mechanism incorporated in the fluid pump whereby the fluid may be prevented from flowing in any direction between the receptacle and the telescoping section when the door is to be held in a stationary position.

The present disclosure further relating to the door opener that further comprises one or more positioning pulleys being incorporated in the positioning system to comprise a path between the opener unit and the door for each of the cables whereby the cables are each extended between one or more positioning pulleys and partially around one or more positioning pulleys in said path.

The present disclosure further relating to the door opener that further comprises the telescoping section incorporating: a lower telescoping portion having one end sealed by a covering member and an open end; and at least one additional telescoping portion disposed within the open end of the said lower telescoping portion such that there is an overlap between said telescoping portions; and whereby forcing the fluid into said telescoping section causes said at least one additional telescoping portion to extend relative to said lower telescoping portion.

The present disclosure further relating to the door opener that further comprises the plurality of unit pulley incorporating: on each opposite outer side of the receptacle one or more lower unit pulleys attached to the outer side of the receptacle; and on each opposite outer side of the uppermost telescoping portion of the telescoping section one or more upper unit pulleys attached to the outer side of said telescoping portion; and wherein each of the cables is partially wound around and extends between the one or more lower unit pulleys and the one or more upper unit pulleys on opposite sides of the opener unit; and wherein as the telescoping section extends tension is exerted on the cables and more length of cable is required to extend between the one or more upper unit pulleys and the one or more lower unit pulleys and the length of cable extending between the door and the opener unit is diminished; and wherein as the telescoping section collapses tension is diminished on the cables and less length of cable is required to extend between the one or more upper unit pulleys and the one or more lower unit pulleys and the length of cable extending between the door and the opener unit is increased.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein:

FIG. 8 is a sectional perspective view of an embodiment of the present invention showing an operation unit positioned on the same wall as the garage door with the garage door in the closed position.

FIG. 21 is an exploded view of a rectangular shape operation unit of an embodiment of the present invention.

FIG. 22 is a partial sectional perspective view of a rectangular shape operation unit of an embodiment of the present invention.

FIG. 23 is a front sectional view of a four pulley operation unit of an embodiment of the present invention.

FIG. 24 is a front sectional view of a six pulley operation unit of an embodiment of the present invention.

FIG. 25 is a front sectional view of an eight pulley operation unit of an embodiment of the present invention.

FIG. 26 is a front sectional view of a ten pulley operation unit of an embodiment of the present invention.

FIG. 27 is a front sectional view of a twelve pulley operation unit of an embodiment of the present invention.

FIG. 28 is a front view showing a cable attached to the door of an embodiment of the present invention.

FIG. 29 is a perspective view of an embodiment of the present invention showing an operation unit with an exploded telescoping section comprising three telescoping portions.

FIG. 30 is a perspective view of an embodiment of the present invention showing an operation unit with an exploded telescoping section comprising four telescoping portions.

FIG. 31 is a perspective view of an embodiment of the present invention showing an operation unit with an exploded telescoping section comprising five telescoping portions.

FIG. 32 is a perspective view of an embodiment of the present invention showing an operation unit with an exploded telescoping section comprising six telescoping portions.

FIG. 34 is a front view of an embodiment of the present invention showing an operation unit with the pump within the fluid receptacle and the telescoping section external to the receptacle.

Figure 1:
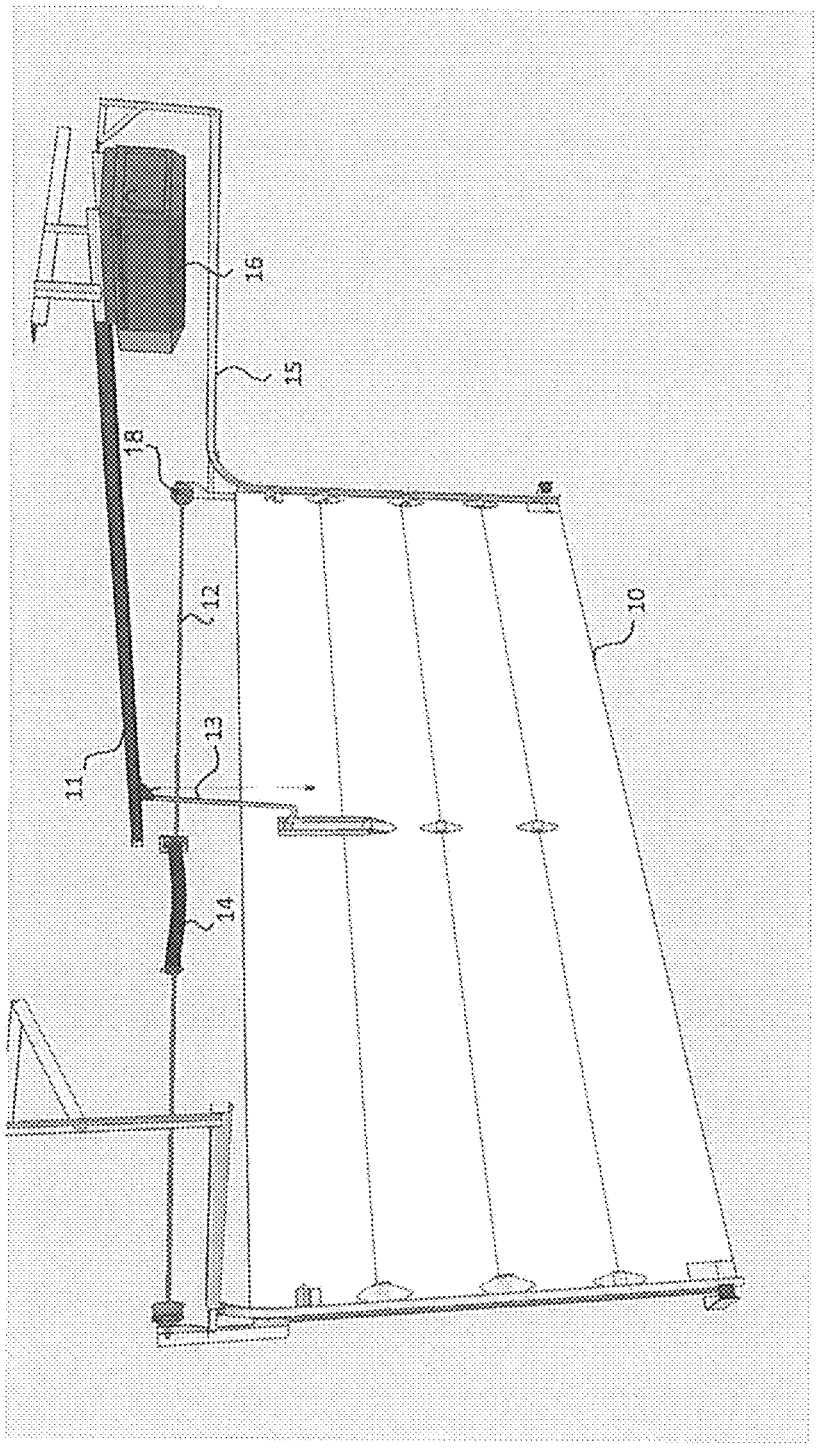
FIG. 1 shows an example of a prior art tension spring operated garage door opener with an overhead track.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is a door opener operable to open doors of various weights, heights and widths, comprising cables attached to the door and further attached to an operation unit. The operation unit incorporates a telescoping section driven to extend and compress by the function of a fluid pump. The telescoping section comprises two or more telescoping portions. The extension of at least one telescoping portion creates tension in the cables and causes the door to be moved from a closed or semi-closed position to an open or semi-open position. The compression of at least one telescoping portion reduces tension in a constant or near-constant manner so that the door is caused to move from an open or semi-open position to a closed position or semi-closed position. The pump only requires power while at least one telescoping portion is extending and therefore power is only required while the door is being moved towards an open position.

The door can be of any size or weight. The door may be formed of a single panel. The door may also be comprised of two or more panels, such as horizontal panels pivotally interconnected along the horizontal sides by a plurality of pivot brackets. The door may be coupled on either lateral side to guide tracks by at least one roller wheel. For example, a door comprised of a single panel may have a single roller wheel on each lateral side coupled with the guide track, for example, such as at the upper section of the lateral side, or at any other position along the lateral side. Whereas a door comprised of multiple panels may have roller wheels positioned at intervals (that may be equi-intervals, or varying intervals) along the lateral sides of the door that are coupled with the guide track.

At least two cables are connected to the door, for example, such as one cable being attached at the lower portion of one lateral side of the door and the other cable being attached at the lower portion of the opposite lateral side of the door. The cables can also be positioned otherwise to connect to the door. Whenever the cables are connected to the door tension exerted on the cables will assist to lift the door, and relief, or at least diminishment, of tension upon the cables will assist to lower the door.

The cables are further connected to the operation unit. The operation unit may be positioned anywhere in proximity to the door whereby cables can extend from the door to the unit. The cables will extend through a configuration of pulleys that can be of any configuration that allows tension to be exerted or increased, and relieved or diminished, from the cables in accordance with the extension and compression of the telescoping section of the operation unit. Thus, the extension and compression of the telescoping section of the operation unit will increase and decrease the length of cable required to be wound partially around and between upper and lower unit pulleys, respectively. This will further alter the length of the cables that extends between the operation unit and the door.

As the cable length between the operation unit and the door is made shorter due to a greater length of cable being required to be partially wound around and between the upper and lower unit pulleys (as the telescoping section extends), tension will increase in the cables. This will cause the door to move towards an open position. Whereas, as the cable length between the operation unit and the door is made longer due to a lesser length of cable being required to be partially wound around and between the upper and lower unit pulleys (as the telescoping section compresses), tension will decrease in the cables. This will cause the door to move towards a closed position.

The cables pass partially around the upper unit pulleys attached to the telescoping section. The telescoping section is positioned in a receptacle of the operation unit. The telescoping portions can extend beyond the receptacle. Fluid may be present in the receptacle.

The telescoping portions of the operation unit may be caused to extend and compress in accordance with the function of a fluid pump mechanism. When compressed upper and middle telescoping portions of the telescoping section may be positioned so that the upper telescoping portion fits within the middle telescoping portion, and the middle telescoping portion may fit within a lower telescoping portion. The lower telescoping portion will remain in a stable, constant position. The positions of the other telescoping portions will change in relation to the position of the lower telescoping portion and in some instances in relation to the position of the other telescoping portions in the same telescoping section, as the telescoping portions, other than the lower telescoping portion, extend and compress.

The telescoping portions may extend and compress in a specific order. In some embodiments of the present invention the upper telescoping portion will extend first and collapse last, whereas in other embodiments of the present invention the middle telescoping portion may extend first and collapse last. In embodiments of the present invention, telescoping portions may fully extend or collapse before the subsequent telescoping portion extends or collapses. Whereas in other embodiments of the present invention, telescoping portions may only be partially extended or collapsed before a subsequent telescoping portion begins to extend or collapse, such that two or more telescoping portions may simultaneously extend and collapse. A skilled reader will recognize how the order of the extension and compression of the telescoping portions will be constant and the order of extension and order of compression will be opposites.

When fully extended the upper telescoping portion may only overlap at its lower edge with the upper edge of the middle telescoping portion and the lower edge of the middle telescoping portion may only overlap with the upper edge of the lower telescoping portion. A skilled reader will recognize that more than three telescoping portions may be included in the telescoping section of embodiments of the present invention depending on the weight, height and other characteristics of the door that is to be moved between open and closed positions.

The fluid pump may function to cause fluid to be injected into the telescoping section of the operation unit via a connection portion between the fluid pump and the telescoping section. The fluid may be drawn into the fluid pump from the receptacle of the operation unit through an inlet/outlet port of the fluid pump. The fluid pump may cause fluid to be injected into the telescoping section so as to cause the telescoping portions thereof to be raised. As fluid is pumped into the telescoping section the middle telescoping portion will be raised in relation to the lower telescoping portion, followed by the upper telescoping portion being raised in relation to the middle telescoping portion. As the cables are attached to either side of the upper edge of the upper telescoping portion, the greater the extension of the telescoping portions the greater the tension exerted upon the cables and the greater the length of cable required to be wound around and between the pulleys attached to the sides of the operation unit to extend between the pulleys. Therefore, the extension and the compression of the telescoping portion will respectively increase and decrease tension on the cables. The increase and decrease of tension upon the cables will cause the door to be moved between open and closed positions.

The fluid pump will act to inject fluid into the telescoping section. Fluid can also flow out of the telescoping section. The flow of fluid to and from the telescoping section may cause the telescoping section to operate. Pressurized fluid may enter and leave the telescoping section via the connection port. The fluid pumped into the telescoping section may push against the telescoping portions. The fluid may further expand within the telescoping section which will increase the push against the telescoping portions. The push of the fluid may cause the telescoping portions to extend and thereby be raised gradually in stages. The lowest telescoping portion remains stationary and the other telescoping portions extend and thereby rise. As a greater volume of fluid may utilize less pressure per lifting ton, the largest telescoping portion may be raised first, and the next largest telescoping portion may be raised next. This sequence may proceed in succession, until the last and smallest telescoping portion is raised. Lowering, or collapsing, of the telescoping portions may proceed from the opposite operation. Therefore, when the telescoping portions are collapsing, the smallest telescoping portion may be lowered first.

The pump will only function when liquid is injected into the cylinder to extend the telescoping portions. When the pump ceases to function the liquid may be held in the cylinder if the door is to be held open for a period of time. While the liquid remains in the cylinder the telescoping portions will remain extended.

When the door is to be lowered the liquid will be transferred through the connection port of the fluid pump from the telescoping section back to the receptacle. The liquid will thereby transfer from the telescoping section to the receptacle. As the amount of liquid in the telescoping section decreases the telescoping portions will compress in a controlled manner. Therefore, power utilized to cause the pump to function, whether the power be electricity, battery power, or some other power, will only be utilized while the telescoping portions are extending. Thus, power will only be required when a garage door is being opened. Power will not be required to compress the telescoping section and to thereby cause the door to be moved towards a closed position.

The fluid utilized in the operation unit may be any liquid. Liquid may be chosen in accordance with environment where the present invention will be utilized. For example, if the operation unit is to be utilized in an area that will experience freezing or below freezing temperatures the liquid utilized may have a low freezing point, or incorporate an anti-freeze liquid component. A re-fill port may be incorporated in the receptacle whereby liquid can be added to the receptacle from time-to-time. For example, liquid may be added to the receptacle should any evaporation of the liquid occur. A skilled reader will recognize that liquid loss may occur for other reasons and the liquid may need to be refilled or replenished from time-to-time.

The present invention may offer several advantages over the prior art. Many prior art door opener systems are specifically designed to open garage doors, or other doors for entry into a building. These systems generally require a track to be attached to an area of the ceiling extending from above the door. Therefore, these systems cannot function with doors that do not open into a garage space or other space that has a ceiling. The present invention does not require that the door it is used with open into a space with a ceiling. The cables attached to the door and to the operation unit of the present invention can extend a distance from the door through a pulley configuration and do not need to be attached to a ceiling.

Another related benefit of the present invention is that it does not need to fill space within a building, such as prior art systems that require a track to be mounted in the ceiling of a building and thereby extends into space in the building and reduces the available space in the building. Another example of prior art that reduces the space available proximate to the door, are prior art systems that require a ceiling mounted track and an arm extending between the track and the door, such that the arm hangs below the track and thereby fills and impedes the use of even more overhead space than the track alone. An example of such prior art is shown in FIG. 1. Such prior art systems take up space that could be utilized for other uses, such as overhead storage. These prior art systems further limit the height of any vehicle or other item that can be located beneath the ceiling mounted track. The present invention does not require any overhead track, and further only requires cables to extend from a door to the operation unit. The operation unit can be located so it is not inside a building. Therefore, the present invention does not create limitations for use of any space in the proximity of the door, other than the minimal space needed for the cables and pulleys configuration extending from the door. The result is that the present invention does not create significant space limitations as are created by the prior art.

Figure 2:
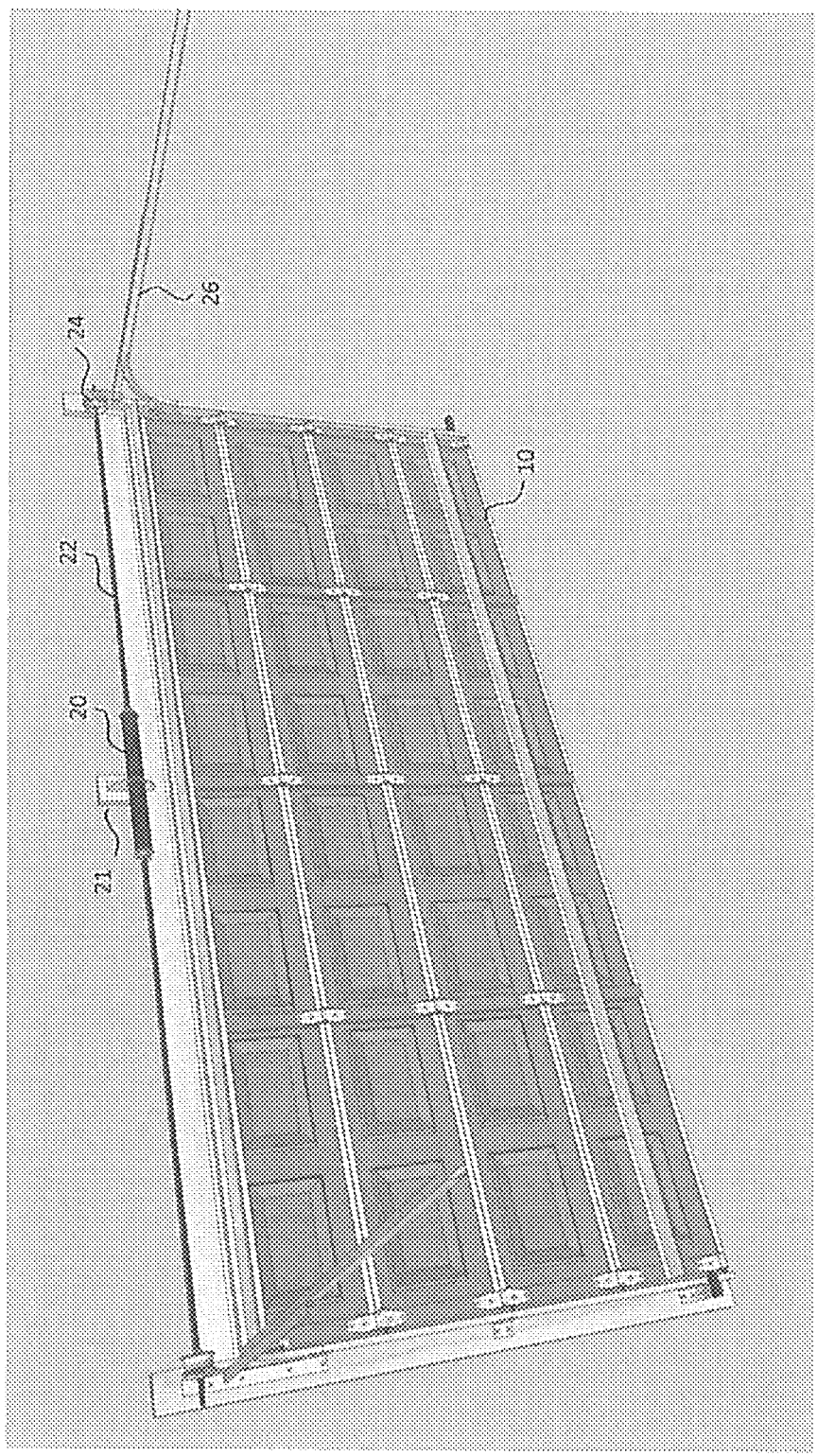
FIG. 2 shows an example of a prior art tension spring manually operated garage door.

Other prior art door opener systems require that a spring and shaft combination be mounted on a surface directly above the door and that the shaft be connected to at least one wall that is located at a right angle, or otherwise to the side of the door. Such a prior art system is shown in FIG. 2. This type of prior art system requires that there be a surface above the door to mount the shaft and a surface to at least one side of the door that the shaft can be connected to for the purpose of securing the shaft. Therefore, this type of prior art can only be used with doors that have at least one adjacent wall and wall space above the door. The present invention does not require any specific wall configuration in relation to the door. The cables and pulleys between the door and the operation unit of the present invention can be configured in accordance with any existing environment proximate to the door.

Furthermore, shaft and spring combination prior art systems require cables to extend from the door to drums connected to the shaft the cables are wound around the drums in accordance with the torsion of the shaft and spring combination. Therefore, the cables of such prior art systems are constantly under tension. The present invention does not require that the cables be extending between the door and the operation unit be under tension at all times. For example, the cables of the present invention may not be under tension when the telescoping portions are collapsed, the door is closed, or when the telescoping portions are not moving to extend or compress. One particular risk created by cables connected to a door that are constantly under tension, as in the prior art, is that the cables can become unable to withstand the tension. If that should happen one or more of the cables can break. The result of a break can be that the weight of the door causes the door to move quickly in an uncontrolled free-fall towards the ground and possibly to crash to the ground. This can cause injury to any person located beneath the door, and/or damage to any object located beneath the door. The present invention avoids this risk by not requiring constant tension to be exerted on the cables.

Yet another benefit of the present invention is that it is operable to lift the weight of a door. Prior art systems balance the weight of the door and therefore are not operable to lift the weight of the door, but to lift only the offset weight of the door. For example, a torsion spring assembly is required by prior art doors to balance the weight of the door and thereby cause the door to be liftable. Therefore, in prior art systems the act of lifting the door does not require any person or element of the system to bear the weight of the door. The present invention does not require any element to balance the weight of the door in order for the operation unit to be operable to lift the door. The present invention is capable of lifting the weight of the door outright in a controlled manner and to bear the weight of the door as the door is lowered in a controlled manner.

A related benefit of this aspect of the present invention is that the present invention can bear the entire weight of the door. Prior art systems cannot bear the entire weight of the door. Thus, if an elements of the prior art system that acts to offset the weight of the door break, the door may come crashing down because the breakage of the element causes the weight of the door to no longer be distributed and the system cannot bear the whole of the weight of the door. The present invention can bear the entire weight of the door and therefore is not susceptible to this risk posed by the prior art systems.

The springs in prior art door opener systems that offset the weight of the door by balancing the weight of the door reduces the human or mechanical effort required to operate the door, but also creates a significant amount of tension in the spring. Due to the fact that the present invention does not require any spring, it does not incorporate any spring section that is under significant tension as exists in the prior art door opener systems. A benefit of the present invention is therefore that the present invention does not present the risk that the spring may break due to the tension in the spring. Should the spring break it can pose a danger to any bystander as the spring itself or metal pieces from the spring can be launched through the air. A bystander may experience bodily harm if they are hit with the spring or any metal piece that is so launched.

Another risk of the shaft and spring combination prior art is that to maintain the requisite tension in the cables it may be necessary to wind the springs on the shaft. Winding of the springs creates tension in the cables wound around the drum so as to encircle the drum, possibly many times. As the spring is proximate to the shaft which is mounted above the door, this step generally requires that the person winding the spring be up a ladder while performing the winding. There is a risk that the person may fall from the ladder while winding the spring and injure himself or be injured during the winding process by the cables that are under tension should such cables slip or be otherwise affected to create uncontrolled spinning of the drums, or other causes. The present invention does not require that the any spring be wound. The present invention also does not require any cable to fully encircle the pulley as required by the prior art and thereby avoids this risk that the prior art systems pose. Moreover, as the pulleys and cables extending between the door and the operation unit in the present invention can be configured in a variety of manners, the configuration can be specifically designed to achieve easy initial stringing of the cables, and easy access to the cables and pulleys for purposes of maintenance, should any maintenance be required. The present invention is quick, easy and safe to install and also quick, easy and safe to maintain as compared to prior art systems.

Another benefit of the present invention over the prior art is that it does not require power to both open and to close the door, and neither opening nor closing the door is a manual process. Prior art systems generally involve the opening and closing of a door to be either an entirely manual procedure, or an entirely powered procedure. The present invention only requires the opening of a door to require power input. Closing the door does not require any power input in the present invention. Therefore, the present invention has several benefits over the prior art as it: requires at least half the power required by fully powered prior art systems; does not require any manual effort; and is environmentally friendly due to its reduced power requirements in comparison to non-manual prior art systems.

Yet another benefit of the present invention over the prior art is that it is easy to configure and maintenance to the present invention will be less expensive to fix than prior art systems. Generally prior art systems involve multiple elements, including complex motors, chains, tracks, arms, cables, and other parts, depending on the configuration of the prior art door opener. The multiple pieces cause the prior art systems to be complex and time consuming to install and to maintain. Moreover, prior art systems can be costly to fix as a motor specialist or other mechanical specialist may need to be engaged to maintain and fix a prior art system. The present invention incorporates relatively few elements as compared to prior art systems, therefore it can be quick, easy and inexpensive to install, maintain and fix.

A related benefit of the present invention over the prior systems is that at least one embodiment of the present invention can comprise off-the-shelf components. Prior art systems generally require custom designed elements to be assembled to produce the systems. Embodiments of the present invention that comprises off-the-shelf components can be quick to assemble and repair as the parts necessary are readily available. Other embodiments of the present invention can incorporate a combination of off-the-shelf and custom parts. Such embodiments of the present invention may be quicker to assemble and repair than prior art systems that entirely comprise custom parts.

Yet another benefit of the present invention over the prior art is that it can be utilized with doors that are formed of one-piece or that comprise two or more panels. Prior art systems are generally configured to be operable either with one-piece doors or paneled doors, but not with both types of doors. Thus, the present invention has a greater range of applications than the prior art systems.

Yet another benefit of the present invention over the prior art systems is that the operation unit is not require to be positioned near to the door. Prior art systems generally require the operation mechanism to be positioned in the ceiling, on the wall directly above the door, or otherwise near to the door This is due to the configuration of the elements of the operation mechanism that cause the door to open and close, such as chain drives and tracks that a door is by to open and close. The operation unit of the present invention is solely required to be connected to the cables that extend from the door. The cables can be of any length, and therefore the operation unit of the present invention can be positioned in a variety of positions, either near or distant from the door. The configuration of pulleys that the cables pass through can be configured in a variety of manners to facilitate the position of the operation unit. Moreover the operation unit can be positioned in a variety of directions—e.g., facing horizontally, or vertically, or in any direction in between, as well as mounted upon a surface, etc.

An example of a prior art automated garage door opening system is shown in FIG. 1. The door 10 is connected to an arm 13. The arm has a connection to a ceiling track 11 that is attached to the ceiling of a garage. The ceiling track is further connected to a motor that is fit within a housing 16. The housing may further incorporate other elements such as an overhead light, alarm, control module, smoke detector, carbon monoxide detector, or other elements. The motor is connected to a belt, chain or cable drive that the motor operates to move the arm along the ceiling track and thereby cause the door to open or close. When the door is opened and closed rollers attached to the sides of the door may move along the side track 15. A shaft 12 and spring 14 combination may be connected to a drum 18 positioned at the end of the shaft. The shaft, spring and drums are positioned above the door. The shaft and spring combination may wind cables connected to the door around the drums when the door is opened and unwind the cables when the door is closed.

Another example of a prior art garage door opening system is shown in FIG. 2. This prior art system is a manual system and it incorporates a shaft 22 and spring 20 combination with drums 24 at the ends of the shaft. The shaft, spring and drums are positioned above the door 10 and the shaft is held in position by a brace mechanism 21 that is attached to the wall above the door. When manual force is exerted upon the door 10 it will move between an open and closed position depending on the direction of the force. As the door moves cables attached to the door will wind around the drums in accordance with torsion of the shaft and spring combination. Rollers connected to the side of the door may move along a side track 26 as the door moves.

Figure 3:
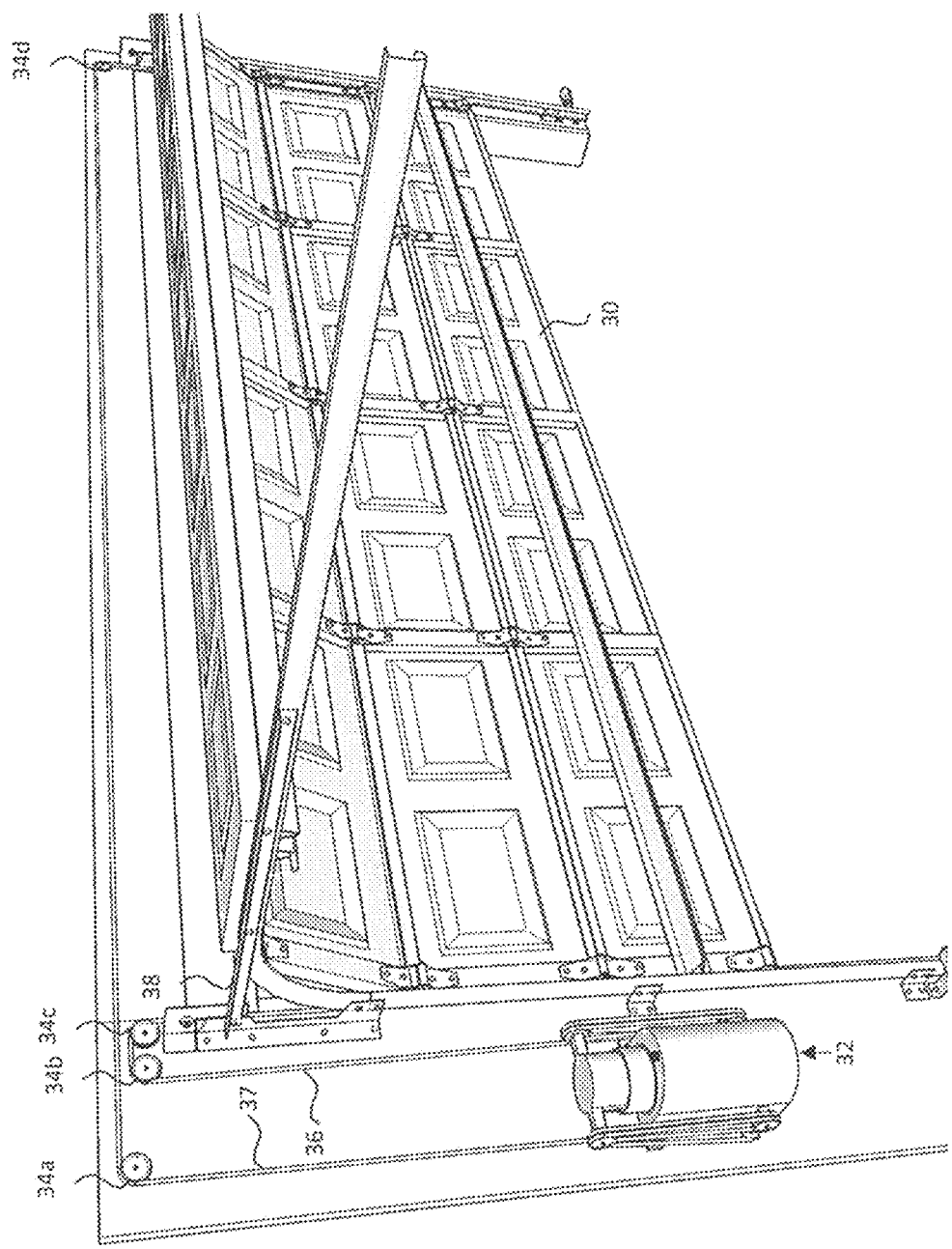
FIG. 3 is a perspective view of an embodiment of the present invention showing a configuration of pulleys with the cable extending from the garage door through the pulleys to the operation unit positioned beside the garage door.

An embodiment of the present invention is shown in FIG. 3. Cables 36 and 37 are connected to the door 30. As an example, as shown in FIG. 28, cable 36 may be attached to the lower corner of the door 30 by a cable attachment means. The other cable can be attached to the opposite side of the door in the same, a similar manner, or a different manner. Each of the cables is required to be attached to the door, for example, such as by a cable attachment means that is a retaining piece 35 formed of metal, plastic or another material, a bracket, a screw attachment, a staple attachment, a nail attachment, or another cable attachment means that fixedly or non-fixedly attaches the cable to the door in a manner whereby the cable is held in attachment to the door even as tension is exerted, increased, decreased, or relieved from the cable.

Figure 9:
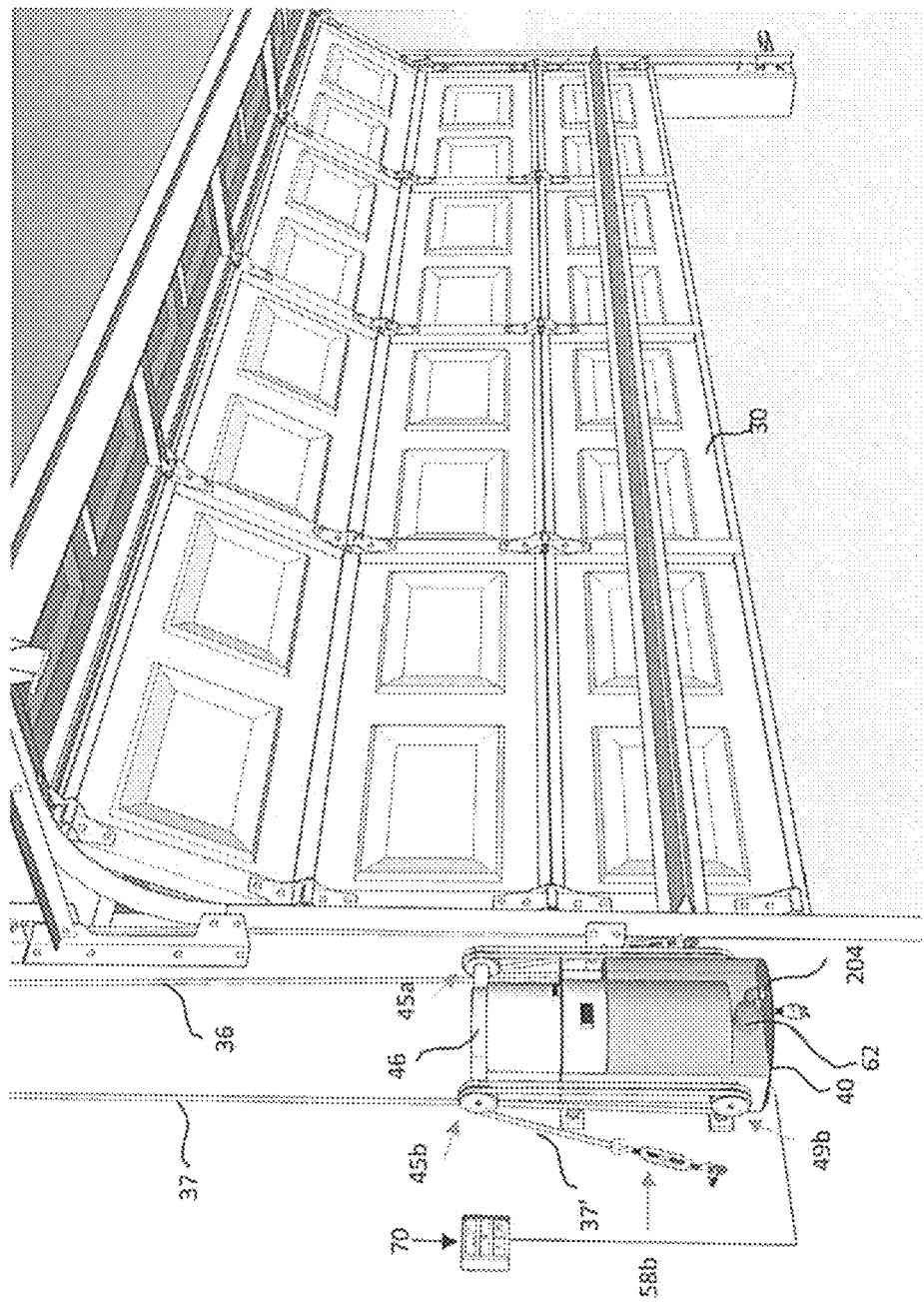
FIG. 9 is a sectional perspective view of an embodiment of the present invention showing an operation unit positioned on the same wall as the garage door with the garage door in a semi-open position.

The cables each extend from the door to opposite sides of the operation unit 32. As shown in FIG. 9, the operation unit incorporates a telescoping section that is extendable and compressible. The operation unit further incorporates lower unit pulleys 49b positioned near the bottom of each side of the operation unit and upper unit pulleys 45a, 45b at each side of the upper telescoping portion of the telescoping section. The cables 36, 37 are extended around a portion of the lower unit pulleys and between the lower and upper unit pulleys and around a portion of the upper unit pulleys. Embodiments of the present invention may incorporate multiple upper and lower unit pulleys in a variety of combinations, as shown in FIGS. 23-27. In such embodiments of the present invention the cables may be wound around a portion of each of the unit pulleys. After the cable is wound around the upper and lower unit pulleys the end of the cable 37' may be fixedly or non-fixedly secured in some manner. For example, the end of the cable may be secured to the operation unit, to an anchoring means 58b, or to a surface such as a wall or another surface.

When the telescoping section of the operation unit is extended tension will be created in the cables a greater length and of the cable will be required to extend between the upper and lower unit pulleys because the distance between the upper and lower unit pulleys will increase. Therefore, a diminished length of the cable will extend between the operation unit and the door. The tension and diminished length will cause the door to react by moving in a direction that causes the door to move towards an open position. When the telescoping portion of the operation unit is compressed tension will decrease as the distance between the upper and lower unit pulleys will diminish and a lesser length of the cables will be required to extend between the upper and lower unit pulleys. Thus, the length of the cables between the operation unit and the door will increase. The decrease in tension and the increased length of the cables between the operation unit and the door will cause the door to react by moving in a direction that causes the door to move towards a closed position.

In an embodiment of the present invention the door may incorporate one or more rollers along its side edges that are rollable along a track 27 positioned proximate to the door. The rolling of the rollers along the track may control the position and movement of the door as it moves between an opened and closed position. The movement along the track may further control the disbursement of the weight of the door as it moves between an opened and closed position, by preventing the door from tipping in any direction.

The cables can be connected to various portions of the door. For example, one cable may be attached to a lower corner of the door or proximate thereto, while the other cable is attached to the opposite lower corner of the door or proximate thereto. A skilled reader will recognize that the cables may be attached to other locations on the door in other embodiments of the present invention.

Each cable may be directed by one or more positioning pulleys to guide the cable along a particular path as it extends between the door and the operation unit. In particular, the positioning pulleys may be positioned to cause the cable to be guided to be positioned around particular angles. For example, FIG. 3 shows cable 37 being guided between the door and the operation unit by positioning pulleys 34d and 34a. Cable 36 is guided between the door and the operation unit by positioning pulleys 34b and 34c. Each of positioning pulleys 34a, 34b, 34c and 34d guides a cable to be positioned to eventually achieve a 90 degree change in direction. The surface of the positioning pulleys that the cables are in contact with is rounded and this causes the cables to achieve the change in direction more effectively and with less stress on the cable than could be achieved if the cable was strung between the door and the operation unit without any guidance, or if the positioning mechanisms utilized to guide the cables were formed of other shapes, such as shapes with sharper angles.

In one embodiment of the present invention, pulleys may be positioned such that one pulley is directly above the top of each side of the door. For example, as shown in FIG. 3 pulley 34c is directly above the top of the left side of the door, and pulley 34d is directly above the top of the right side of the door. The positioning of two pulleys in this manner can assist with stabilizing the raising and lowering of the door, such that the force exerted upon the door to lift the door through the cables, is stabilized directly above either side of the door. When the door exerts force to lower itself, again the force about the cables is stabilized by the pulleys directly above either side of the door. The positioning of the two pulleys in this manner can also assist in ensuring that the force upon the door and upon the cables is evenly distributed upon either side of the door that is being lifted or lowered.

A skilled reader will recognize that the path of the cables between the door and operation unit can have a variety of configurations and that the configurations may incorporate no pulleys or a varied number of pulleys. Moreover, the same number of positioning pulleys or a lack of positioning pulleys do not need to be used for the path of each cable between the door and the operation unit. Furthermore, the positioning pulleys can guide the cables in the paths that incorporate virtually any angle or set of angles.

Figure 4:
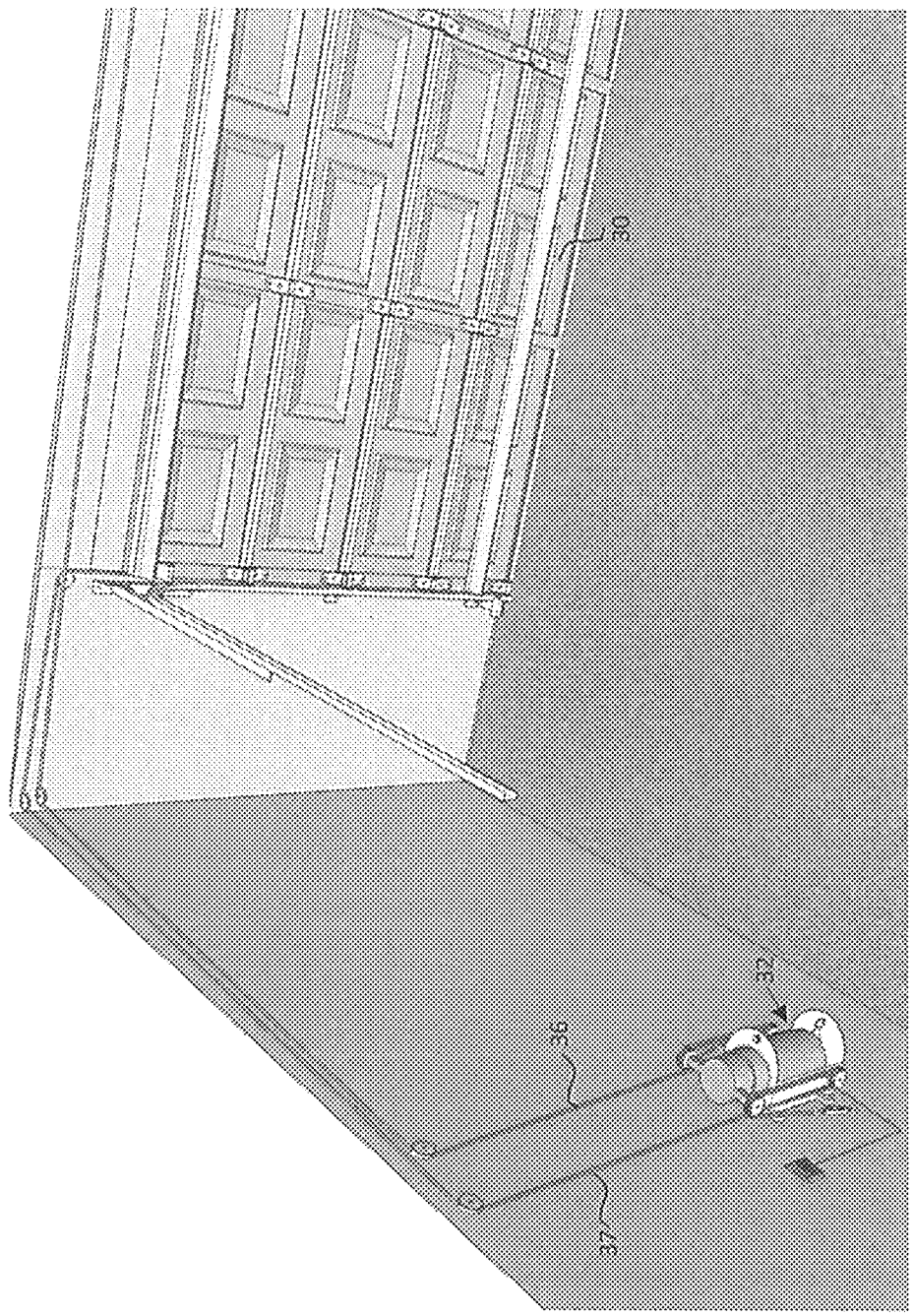
FIG. 4 is a perspective view of an embodiment of the present invention showing a configuration of pulleys with the cable extending from the garage door through the pulleys to the operation unit positioned on a side wall of the garage.

As the cables can have varying paths between the door and the operation unit, the operation unit can be positioned in a variety of different positions in relation to the door. For example, as shown in FIG. 4, the operation unit 32 can be positioned on a surface that is adjacent to the surface where the door 30 is positioned. Furthermore, as shown in FIG. 4 the positioning pulleys can be positioned in a variety of directions, including horizontally and vertically in reference to a surface, such as a wall, to allow for the most effective path of the cables between the operation unit and the door to be achieved.

Figure 5:
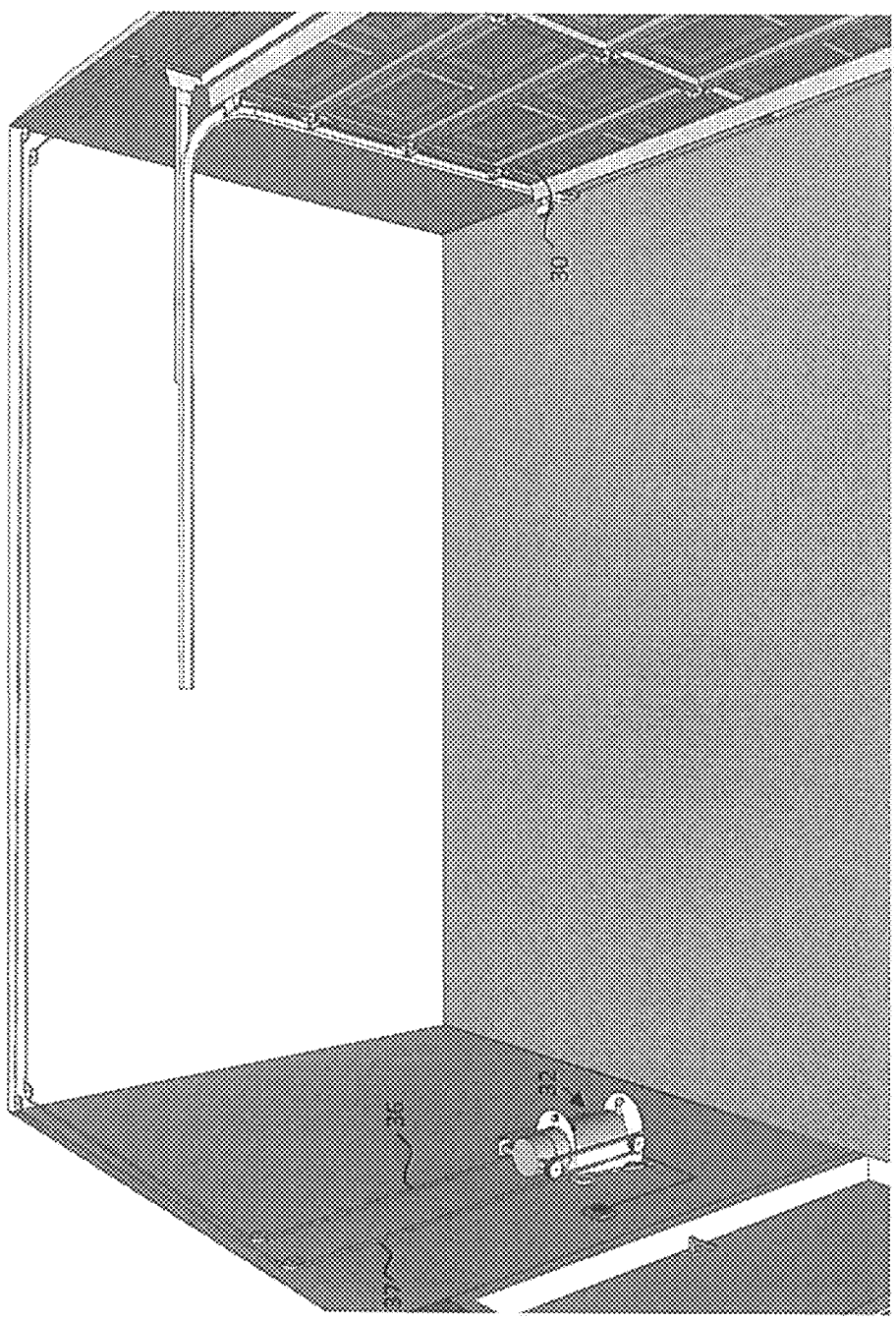
FIG. 5 is a perspective view of an embodiment of the present invention showing a configuration of pulleys with the cable extending from the garage door through the pulleys to the operation unit positioned on the back wall of the garage.
Figure 6:
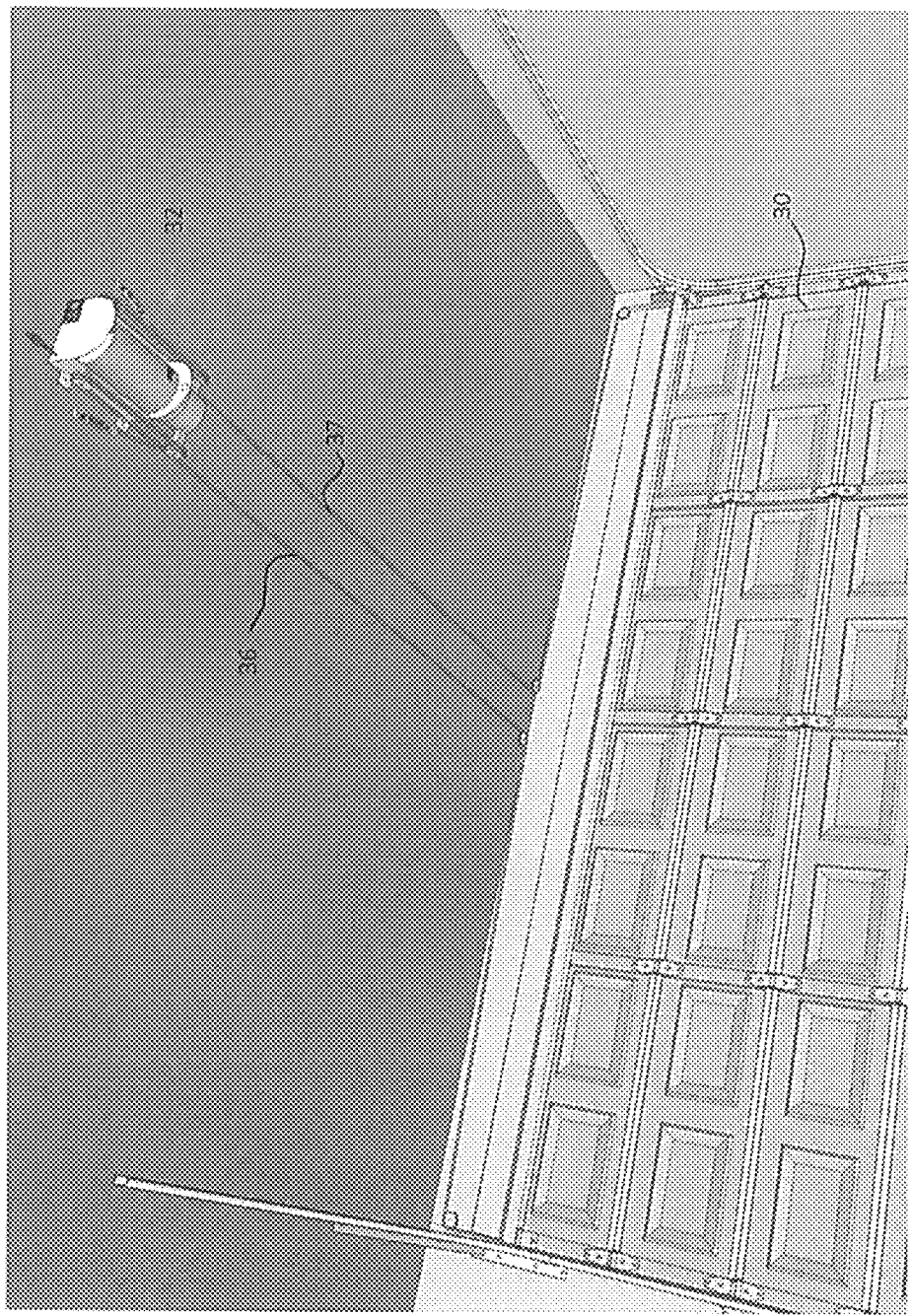
FIG. 6 is a perspective view of an embodiment of the present invention showing a configuration of pulleys with the cable extending from the garage door through the pulleys to the operation unit positioned on the ceiling of the garage.
Figure 15:
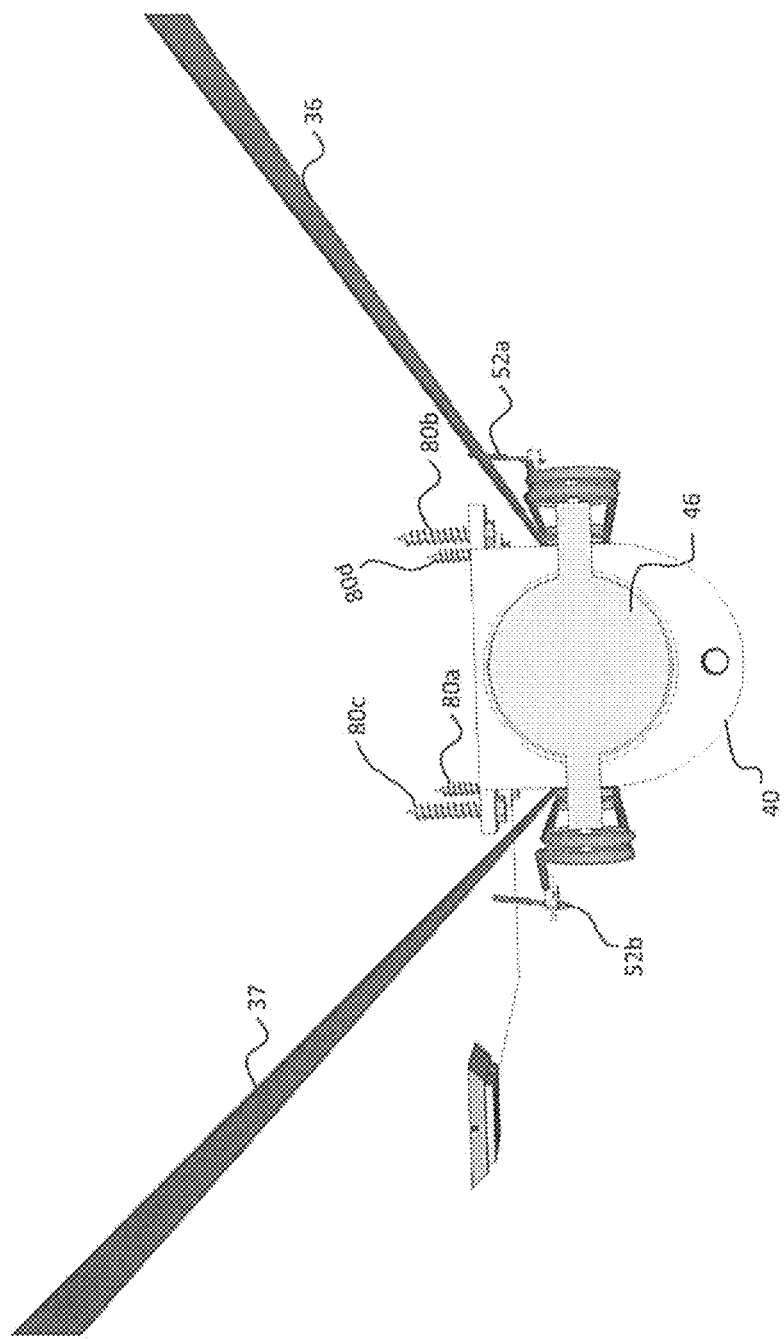
FIG. 15 is a top view of the operation unit of an embodiment of the present invention.
Figure 17:
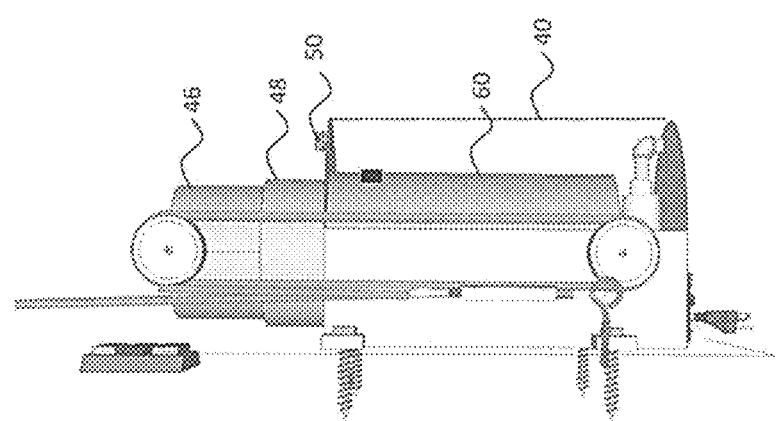
FIG. 17 is a sectional side view of the operation unit of an embodiment of the present invention.
Figure 18:
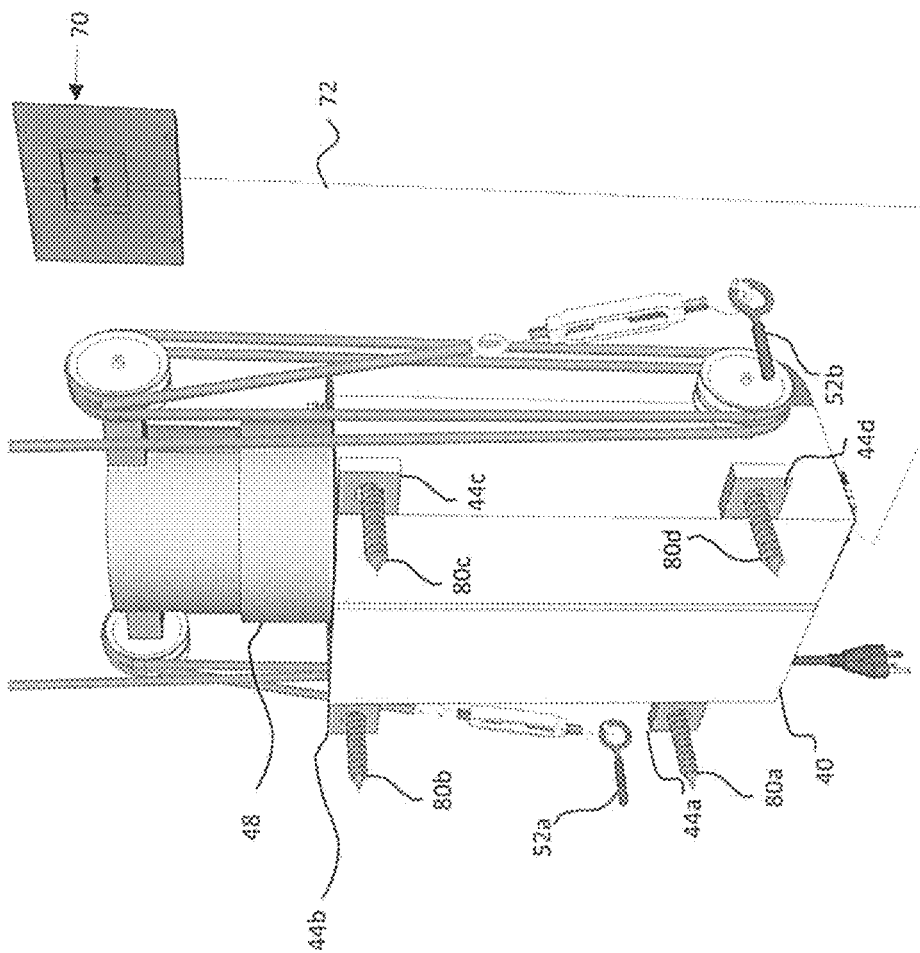
FIG. 18 is a perspective back view of the operation unit of an embodiment of the present invention.

Other possible positions of the operation unit 32 in embodiments of the present invention include on a surface that is opposite to the door 30, as shown in FIG. 5. The operation unit 32 could further be positioned on a ceiling, as shown in FIG. 6. A skilled reader will recognize that an operation unit can be positioned almost anywhere as long as the cables extend between the door and the operation unit. The path of the cables will be directed by positioning pulleys, if such direction is necessary. In embodiments of the present invention, the operation unit may be attached to a surface, for example, such as by attachment means 80a, 80b, 80c, 80d that pass through holes in the operation unit into a surface, as shown in FIGS. 15, 17 and 18. A skilled reader will recognize that the attachment means may be of a variety of types, including screws, nails, or any other attachment or anchoring means whereby the operation unit may be attached to a surface.

As shown in FIGS. 4-6 the path of the cables 36 and 37, and the number and position of the positioning pulleys utilized to direct that path can vary in accordance with the position of the operation unit in relation to the door.

The operation unit is configured of elements that include a receptacle wherein at least a portion of the telescoping section is inserted. The telescoping section may include one or more telescoping portions. In one embodiment of the present invention, the telescoping portions may be shaped as cylinders. The multiple telescoping portions may nest inside one another when the telescoping section is collapsed. The multiple telescoping portions may be positioned sequentially when the telescoping section is extended. The telescoping portions may be shaped so that the diameter of each telescoping portion may decrease sequentially in relation to the preceding cylinder. Variations in pressure exerted within the telescoping portions by fluid may cause the telescoping section to alter between a collapsed and an extended state. Additionally the telescoping section may extend to positions that are less than a fully extended state.

Figure 7:
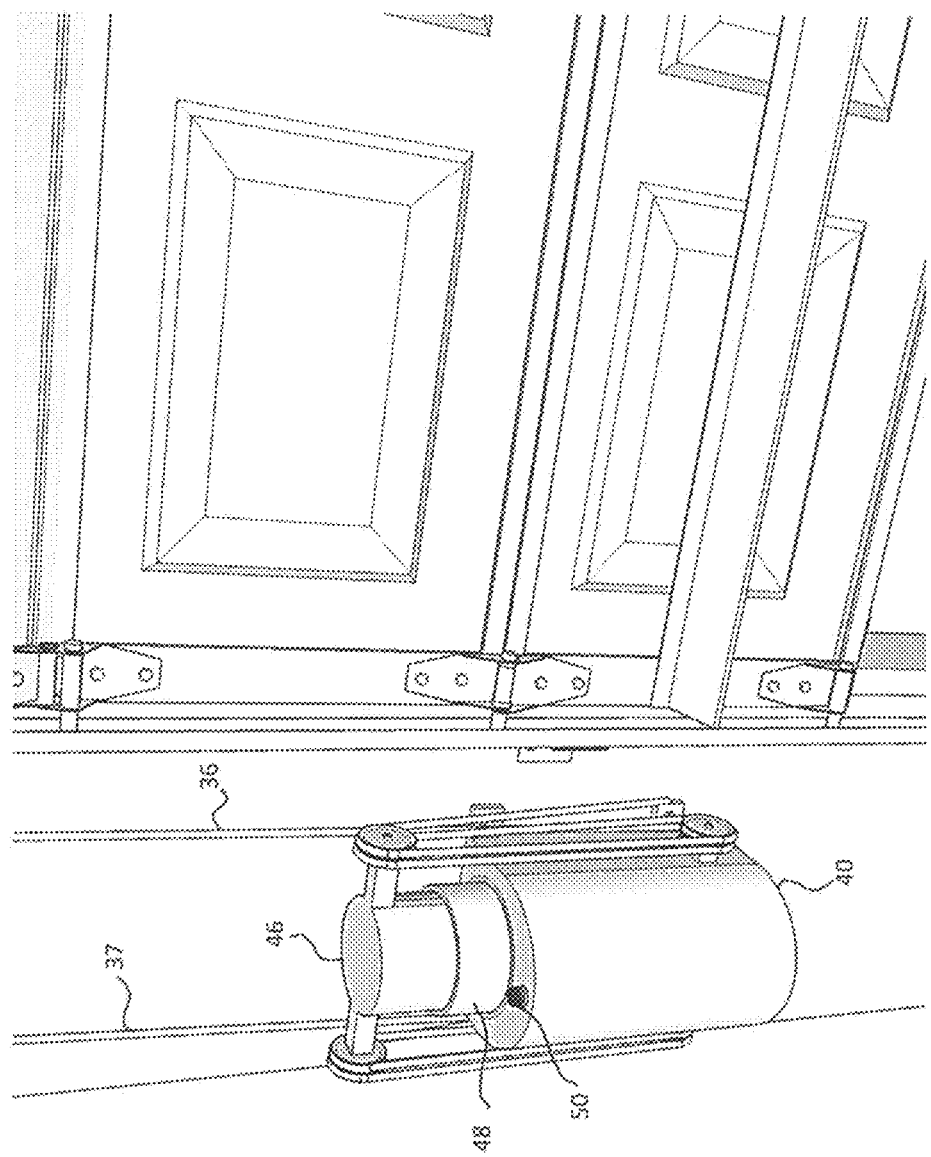
FIG. 7 is a perspective view of an embodiment of the present invention showing an operation unit positioned on the same wall as the garage door.
Figure 19:
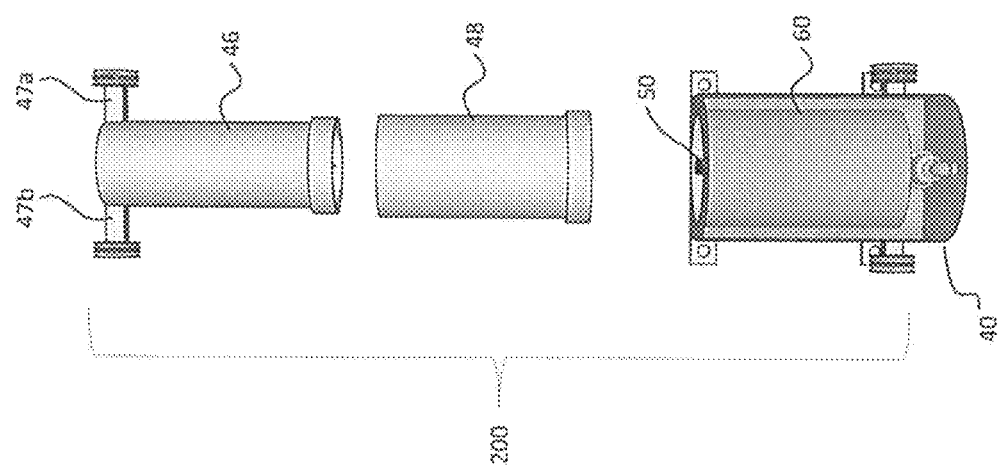
FIG. 19 is an exploded view of the operation unit of an embodiment of the present invention.
Figure 20:
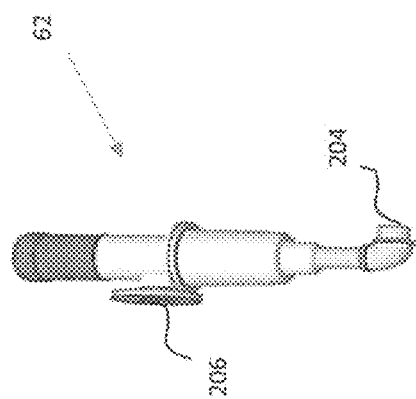
FIG. 20 is a side view of the fluid pump of an embodiment of the present invention.

As shown in FIG. 7, in one embodiments of the present invention, the telescoping section incorporates at least an upper telescoping portion 46, a middle telescoping portion 48 and a lower telescoping portion 60. FIG. 19 shows an exploded view of the telescoping section 200, incorporating the upper telescoping portion 46, the middle telescoping portion 48, and the lower telescoping portion 60. When assembled the telescoping section is positioned within the receptacle 40, as shown in FIG. 9.

In some embodiments of the present invention, a covering element may enclose the telescoping section, such that the telescoping section fits within the covering element, and the covering element may be operable to keep the telescoping section from being directly submerged in the fluid. For example, the covering element may operate as a jacket for the telescoping section that protects the telescoping section from the effects of the fluid, such as rusting, deterioration, or other effects that may occur due to contact between the telescoping section and the fluid. In particular, the covering element may protect the telescoping section from the effects of contact with the fluid that occur over time. In some embodiments of the present invention, the lower telescoping section may be a covering element, so that a separate covering element is not required. Alternatively, the lower telescoping section may have a coating applied thereto that protects the telescoping section from the effects, including long-term effects, of contact with the fluid.

As shown in FIG. 19, the upper telescoping portion may be of a slightly smaller diameter than the middle telescoping portion, so that when the telescoping section is compressed, the upper telescoping portion fits within the middle telescoping portion. The lower telescoping portion may be of a slightly larger diameter than the middle telescoping portion, so that when the telescoping section is compressed the middle telescoping portion (having the upper telescoping portion therein) fits within the lower telescoping portion.

A skilled reader will recognize that the telescoping section of embodiments of the present invention may comprise two or more telescoping portions. All of the multiple telescoping portions of the telescoping section may be sized so as to fit within each other so that the upper telescoping portion is the innermost portion and the subsequent portion is of a slightly larger diameter than the innermost portion, and each subsequent portion is of a slightly larger diameter than the previous portion, so that the portions nest inside one another upto the final lower portion in the telescoping section which is the base portion and the outermost portion.

A skilled reader will further recognize that the shape of the telescoping section and the telescoping portions incorporated therein may vary. As an example, as shown in FIGS. 21 and 22, a rectangular box-shaped telescoping section 202 may be incorporated in the present invention. FIG. 21 shows an exploded view of the rectangular box-shaped upper telescoping portion 100, the rectangular box-shaped middle telescoping portion 102, and the rectangular box-shaped lower telescoping portion 106 that comprise the rectangular box-shaped telescoping section. In an embodiment of the present invention that incorporates a rectangular box-shaped telescoping section, a rectangular box-shaped receptacle 104 may be incorporated in the invention. At least a portion of the rectangular box-shaped telescoping section 202 fits within the rectangular box-shaped receptacle 104. FIG. 22 shows the rectangular box-shaped telescoping section in a near collapsed state, wherein the rectangular box-shaped upper telescoping portion 100 is nearly fully nested within the rectangular box-shaped middle telescoping portion 102, and the rectangular box-shaped middle telescoping portion is nearly fully nested within the rectangular box-shaped lower telescoping portion 106.

The telescoping section, including all portions thereof, such as an upper telescoping portion 46, a middle telescoping portion 48, and a lower telescoping portion 60, fits within a receptacle 40, as shown in FIG. 8. The receptacle has fluid therein. The fluid may be pumped from the receptacle through an inlet/outlet port 204 of the fluid pump 62, and into the telescoping section by a connection port 206 of the fluid pump, as shown in FIG. 208.

Figure 12:
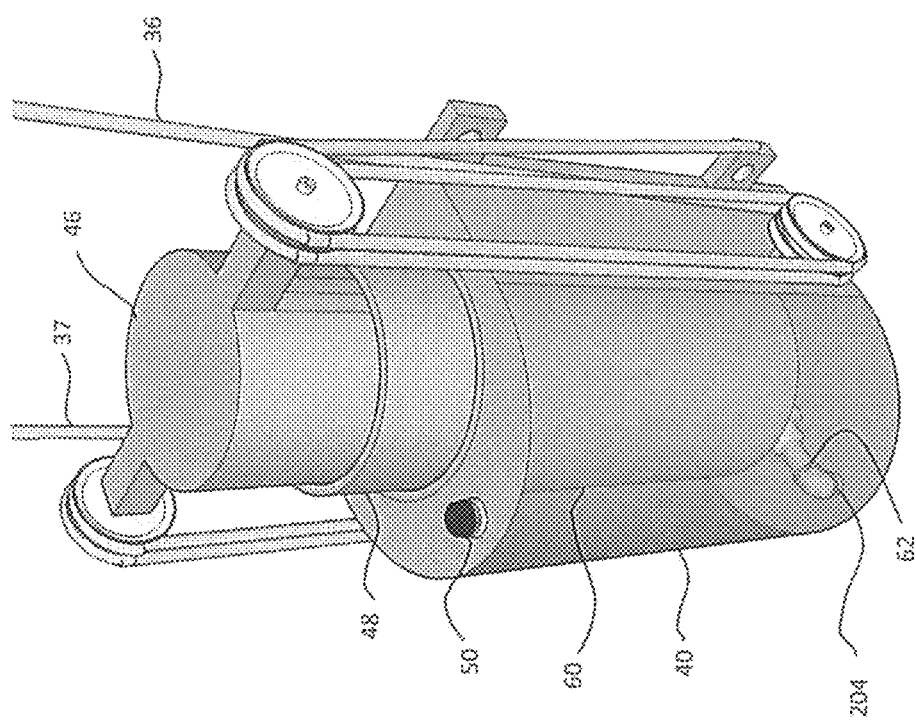
FIG. 12 is a sectional perspective view of the operation unit of an embodiment of the present invention.

As shown in FIG. 12, the fluid pump 62 can be submerged in fluid within the receptacle 40. Fluid in the receptacle that the inlet/outlet port extends into or that the inlet/outlet port is submerged within can be pumped into the fluid pump through the inlet/outlet port. The fluid will be pumped through the connection port when the pump is activated and while the pump continues to function. The fluid pumped by the fluid pump will enter the telescoping section. Fluid that is released from the telescopic section (such as when the fluid pump is not in operation and a fluid release occurs—a fluid release may occur when a fluid release valve is opened) can flow from the telescoping section through the inlet/outlet port into the receptacle.

Generally, the pump will operate when it is connected to a power source, and the pump is turned on. The pump will continue to operate as long as the pump is turned on. A skilled reader will recognize that a variety of operating measures may be applied to the pump in embodiments of the present invention. For example, a power switch may be incorporated in embodiments of the present invention, whereby the connection between the power source and the pump is such that power is provided to the pump, or power is not supplied to the pump. An activation switch may also be incorporated in embodiments of the present invention, whereby the pump can be activated so that it begins to function, or deactivated so that it stops functioning. The functions of the power switch and activation switch may be provided through a single switch in some embodiments of the present invention. There may further be means of operating the valves incorporated in the invention, including switches, dials, indicators, positioning means, or other activators or deactivators. Any of the switches or means of operating the valves that are incorporated in the present invention may be manual or remote controlled, or any combination of manual and remote controlled. For example, in some embodiments of the present invention both remote control and manual options for the same switches and valve operation may be provided. The manual options may act as alternatives or back-ups to use of the remote control options, such that if the manual option does not work the remote control option can be utilized, and vice versa.

Figure 14:
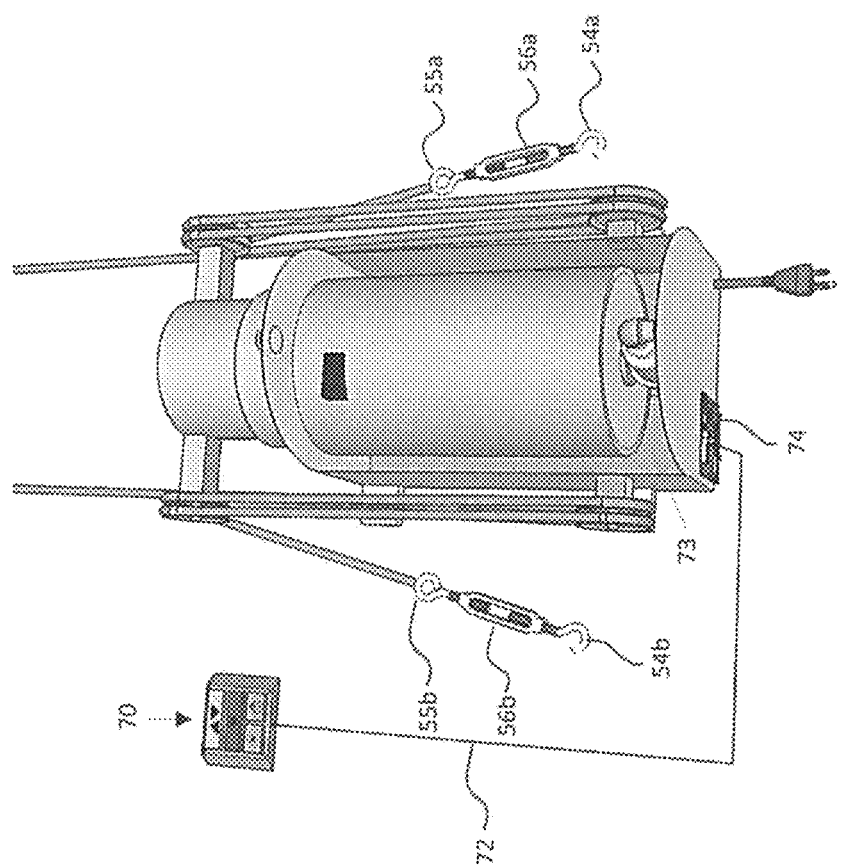
FIG. 14 is a sectional lower perspective view of an embodiment of the present invention showing the operation unit with a sensor unit.

As shown in FIG. 8, the lower telescoping portion has a covering section 73 extending to connect with the walls of the lower telescoping portion and thereby seal one end of the lower telescoping portion, as shown in FIG. 14. This covering section separates the interior of the telescoping section from the interior of the receptacle. The fluid pump 62 is connected to the covering section of the lower telescoping portion wherein there is a hole that is aligned with and connected to the connection port 206 of the fluid pump. Fluid pumped through the fluid pump from the receptacle is pumped into the telescoping section through the connection port.

The liquid pumped into the telescoping section causes pressure to be exerted upon the telescoping portions of the telescoping section. The pressure created by the fluid causes the telescoping section to alter between a collapsed and an extended state, and to positions therebetween as the telescoping portions are extended and thereby raised.

The fluid pump incorporates one or more valves or other means therein whereby when the pump is not functioning to pump fluid from the receptacle into the telescoping section, the fluid may remain within the telescoping section and thereby maintain the fluid pressure therein, which will cause the telescoping section to remain stationary and cause the door to be held at a particular position that is either an open position or a position between opened and closed positions. When positioned in a stop position the valve will prevent any flow of fluid between the telescoping section and the receptacle. To cause the door to continue to move towards an open position the pump will be reactivated and the valve position will be altered when the pump is functioning to allow for the fluid to be pumped from the receptacle into the telescoping section. To cause the door to move towards a closed position the valve position will be altered so that fluid can flow from the telescoping section through the connection port and through the inlet/outlet port into the receptacle.

A skilled reader will recognize that the fluid pump will be rated for a certain pounds per square inch (PSI) rating that indicates the pressure rating of the pump and the PSI that the pump can withstand. The fluid pump incorporated in embodiments of the present invention will be a fluid pump having a PSI rating that is able to sustain the pressure of the fluid in the telescoping section while the door is in an open or partially-open position. The PSI rating requirements for the fluid pump may be related to the weight of the door.

The fluid pump may incorporate both a stop valve that assumes a specific position to prevent the flow of fluid to or from the pump when the pump is stopped, as well as a drain valve that also is moved to specific position when the pump is stopped to thereby prevent the flow of fluid to or from the pump when the pump is stopped. The specific position of each valve when the pump ceases functioning is a "closed" position. Both the stop valve and the drain valve can be utilized to hold a the door in an open or partially open position, by maintaining the fluid within the telescoping section require to keep the telescoping section extended to the point it was extended to when the pump function ceased. The stop valve and/or drain valves can be moved from the closed position to another position whereby fluid can flow from the telescoping section to the receptacle when the pump is not functioning in order to allow the telescoping section to move in the direction of compression and to thereby allow the door to move towards the direction of a closed position.

The invention can be activated to lower the door. The activation will cause the fluid to flow from the telescoping section through the connection port 206 and through the inlet/outlet port 204 of the fluid pump into the receptacle. The pump does not function while the fluid flows from the telescoping section to the receptacle, and therefore the present invention does not require any power while the door is moving towards a closed position or is closed. The flow of fluid from the telescoping section to the receptacle will decrease the fluid pressure in the telescoping section and thereby cause the telescoping portions to move towards a collapsed position. The rate of flow of the fluid from the telescoping section to the receptacle is controlled.

Specifically the rate of flow can be controlled by the size of the connection port, which may be adjustable in embodiments of the present invention so that the rate of flow of the fluid can be adjusted, and thereby the rate of movement towards the closed position of the door can be adjusted. For example the wider the connection port the faster the rate of flow and the rate of movement towards the closed position of the door. Therefore, adjusting the size of the connection port to be narrower can slow the rate of flow and the rate of movement of the door, while widening the connection port can increase the rate of flow and the rate of movement of the door. The size of the connection port may be manually adjusted, or an adjustment lever may extend to the exterior of the operation unit, or a remote adjustment means may be incorporated in an embodiment of the present invention whereby the connection port may be adjusted.

In embodiments of the present invention, one or more flow valves within the fluid pump may also be utilized to adjust the rate of flow of the fluid and the rate of movement of the door. The one or more flow valves may be manually adjusted, or an adjustment lever may extend to the exterior of the operation unit, or a remote adjustment means may be incorporated in an embodiment of the present invention whereby the connection port may be adjusted.

The controlled rate of flow causes a controlled rate of compression of the telescoping portions of the telescoping section, and a controlled movement of the door towards a closed position. Therefore, the door is not be able to unexpectedly crash down towards the ground or otherwise close in an uncontrolled manner or at a varying rate of speed as it descends towards a closed position.

The flow of fluid to and from the telescoping section causes the telescoping portions to operate. Pressurized fluid may enter the telescoping section via the connection port. The fluid may push against the telescoping portions. This may cause the telescoping portions to raise gradually in stages. As a greater volume of fluid may utilize less pressure per lifting ton, the largest in diameter telescoping portion may be raised first, and the largest in diameter telescoping portion may be raised next. This sequence may proceed in succession, until the last and largest telescoping portion is raised. For example, the lower telescoping portion may be raised first, and any other telescoping portions between the lower and the upper telescoping portions may be raised in sequence after the lower telescoping portion, and the upper telescoping portion is raised last. Lowering, or collapsing, of the telescoping portions may proceed from the opposite operation. Therefore, when the composite cylinder is collapsed, the smallest in diameter telescoping portion of the telescoping section may be lowered first, for example, in one embodiment of the present invention the upper telescoping portion may be lowered first and the lower telescoping portion may be lowered last. A skilled reader will recognize that any telescoping portion positioned between the upper and lower telescoping portions will be lowered in sequence in accordance with the diameter of the telescoping portions.

FIG. 8 shows the telescoping section (including upper telescoping portion 46, middle telescoping portion 48 and lower telescoping portion 60) and in a collapsed state. The garage door 30 is closed when the telescoping section is collapsed. The receptacle contains fluid to a level that is higher than the fluid sensor 66 that is attached to the outer side of the lower telescoping portion 60. There is minimal if any tension exerted on either of the cables 37 or 36 when the telescoping section is collapsed. The distance between the upper unit pulleys 45b and the lower unit pulleys is at the smallest distance that occurs during the operation of the present invention.

FIG. 9 shows the operation unit after fluid has been pumped by the fluid pump 62 through the inlet/outlet port 204 therein from the receptacle 40 into the telescoping section. Due to some of the fluid being pumped from the receptacle into the telescoping section, the level of the fluid in the receptacle lowers to below the fluid sensor 66. The fluid pumped into the telescoping section exerts pressure on the telescoping portions. The result of the pressure is that the middle telescoping portion 48 is raised above the lower telescoping portion 60 and the distance between the upper unit pulleys 45b and the lower unit pulleys 49b is greater than the distance between the upper and lower unit pulleys when the telescoping section is collapsed. Thus, as the telescoping section expands tension is exerted on the cables 36 and 37 and the length of each cable required to extend between the upper unit pulleys 45a and 45b and lower unit pulleys 47a and 47b on either side of the operation unit increases. As each of the cables is wound around a portion of the upper and lower unit pulleys on opposite sides of the operation unit, tension is exerted upon the cables and a greater length of each cable is required to be wound between the upper unit pulleys and lower unit pulleys on each side of the operation unit. As tension is exerted upon the cables and the length of cable extending between the operation unit and the door decreases (as more length of cable is required to extend between upper and lower unit pulleys), the door is caused to move from a closed position towards an open position.

As the door is raised and lowered a push and pull relationship is created between the operation unit and the door. Furthermore, when the door is being lifted or closed the door pushes upon the cables and the operation unit creates a pull through its interaction with the cables. An even force is exerted in both the push and the pull exerted between the door and the operation unit.

Figure 10:
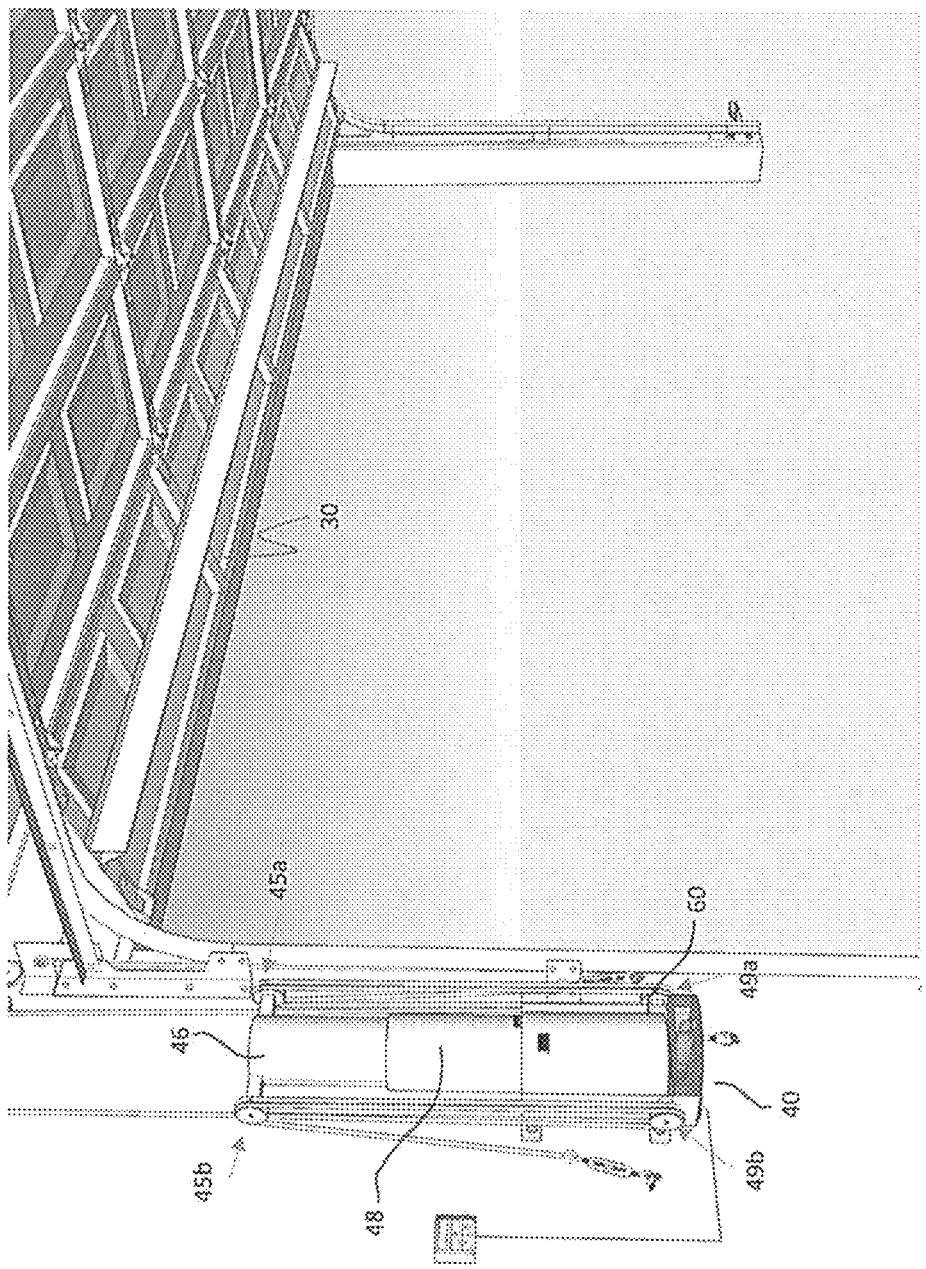
FIG. 10 is a sectional perspective view of an embodiment of the present invention showing an operation unit positioned on the same wall as the garage door with the garage door in an open position.

As shown in FIG. 10, as more fluid is pumped through the inlet/outlet port 204 of the fluid pump 62 into the telescoping section from the receptacle the level of the fluid in the receptacle lowers. The pumped fluid increases pressure upon the telescoping section such that the middle telescoping portion 48 extends above the lower telescoping portion 60, and the upper telescoping portion 46 extends above the middle telescoping portion 48 and the distance between the upper unit pulleys 45b and the lower unit pulleys 49b is greater than the distance between the upper and lower unit pulleys when the telescoping section is collapsed and greater than the distance between the upper and lower unit pulleys when only the middle telescoping section is extended. The distance between the upper and lower unit pulleys increases as the telescoping section extends, and the distance decreases as the telescoping section collapses.

As the telescoping section expands tension is exerted on the cables 36, 37 as the length of each cable required to extend between the upper unit pulleys 45a, 45b and lower unit pulleys 47a, 47b on either side of the operation unit increases. The tension is exerted upon the cables and increased length of cable wound between the upper and lower unit pulleys causes the door to move away from a closed position towards an open position.

Embodiments of the present invention may incorporate one or more sensors that indicate when the door is fully opened and/or fully closed. For example, one of the sensors may sense when the fluid level reaches the level whereby the telescoping section is extended to a level whereby it will have fully opened the door. Such a sensor may be utilized to cause the pump to cease functioning when the door is fully opened. One sensor may also sense the fluid level required when the telescoping section door is compressed and the door is fully closed. This sensor would not activate or inactivate the fluid pump, but could be used in order for the present invention to recognize whether the door is fully closed, and thereby take other activities relating to the opening the door from a fully closed position, or opening or closing the door from a position that is not fully closed.

In other embodiments of the present invention, a travel learning system may programmed into the motherboard. A travel learning system may gather data during the movement of the door from a closed position to an open position and back to a closed position. In this manner the travel learning system can gather data relating to extension or compression of the telescoping section at various levels of the door progression from closed to open and vice versa.

The data can also be applied to a force sensitivity learning system that can be incorporated in embodiments of the present invention whereby the system can recognize the force of the door in the process of opening and closing without any weight being added to the door, or an impediment to the door opening or closing. Therefore, if there is an object hanging from the door that adds weight to the door and increases the force required to open the door the hanging object may be recognized as an impediment to opening the door. In a similar manner increased force required to move the door due to an impediment in the path of the door, such as an object in the path of the door, can be recognized by the system. Recognition of such an impediment may lead to the door ceasing function (e.g., the pump may be stopped if it is functioning, and movement of the telescoping section may be ceased). This system can ensure that the door opens or closes only when it is free of impediments. This can be a safety system in the door as it can keep the door from crushing people, pets and objects that impede the open/close movement of the door.

When in a raised position the door can be very close to a ceiling or other surface that it is positioned near. For example, as shown in FIG. 10, the door can be in close proximity to the ceiling of a room that the door opens into. Unless the operation unit is installed along the ceiling in a position whereby it will be positioned between the opened door and the ceiling (in which circumstance there must be space between the open door and the ceiling that is at least as large as the space that the operation unit requires), the door is only required to be a distance away from the ceiling that allows the door to move freely as it is opened and closed. The possibility of having a the open door be in close proximity to the ceiling has the benefit that a door can be mounted such that the top is at almost the height of the ceiling, and that door can be opened and closed by the operation unit.

Figure 11:
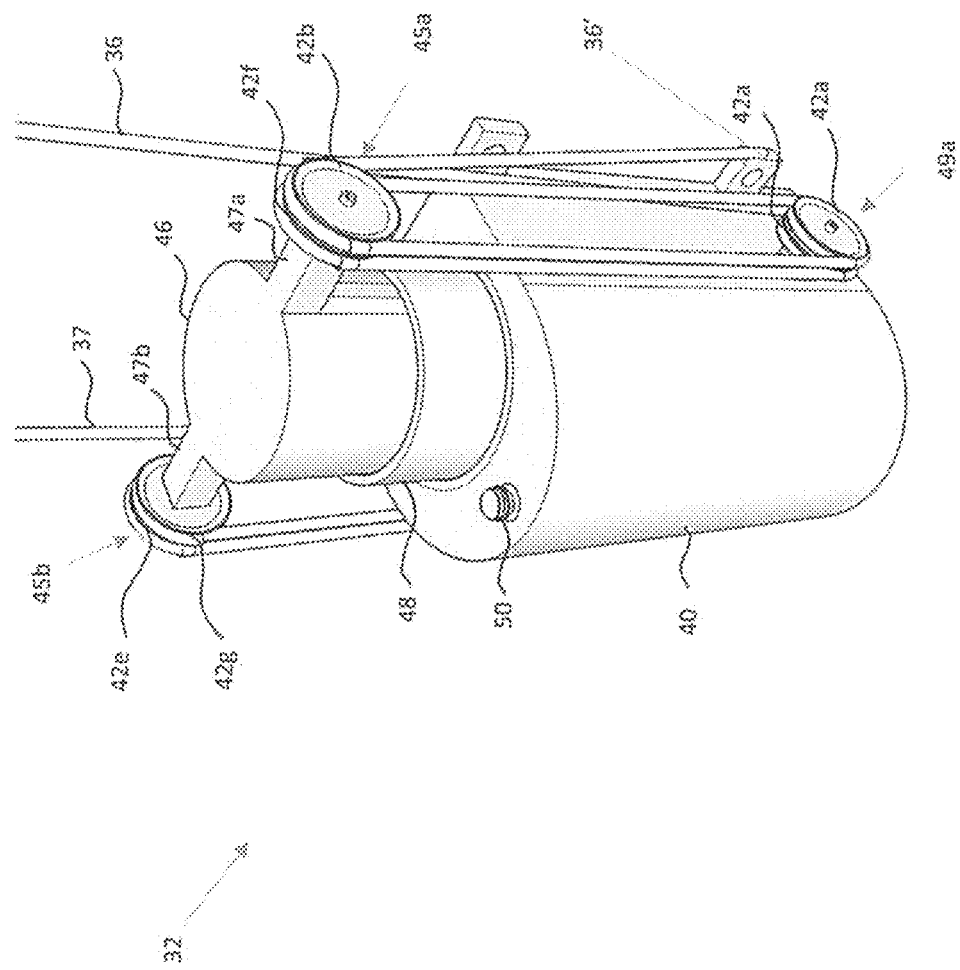
FIG. 11 is a perspective view of the operation unit of an embodiment of the present invention.

As shown in FIG. 11, the lower unit pulleys 49a may incorporate two lower unit pulleys 42a, 42e (the lower unit pulleys 49b are not shown in FIG. 11, but may also include 2 pulleys 42d, 42f), while the upper unit pulleys 45a, 45b may each include two upper unit pulleys 42b and 42f, 42c and 42g respectively. The upper telescoping portion may incorporate two side arms 47a, 47b on opposite sides of the section of the upper telescoping portion most distantly positioned from the middle telescoping section. The upper unit pulleys 45a, 45b may each be connected to one of the side arms. The lower unit pulleys 49a, 49b may each be attached to opposite outer sides of the receptacle 40, or otherwise attached to the operation unit. The cables 36, 37 are each wound around a portion of the upper unit pulleys and lower side pulley on opposite sides of the operation unit 32.

Figure 13:
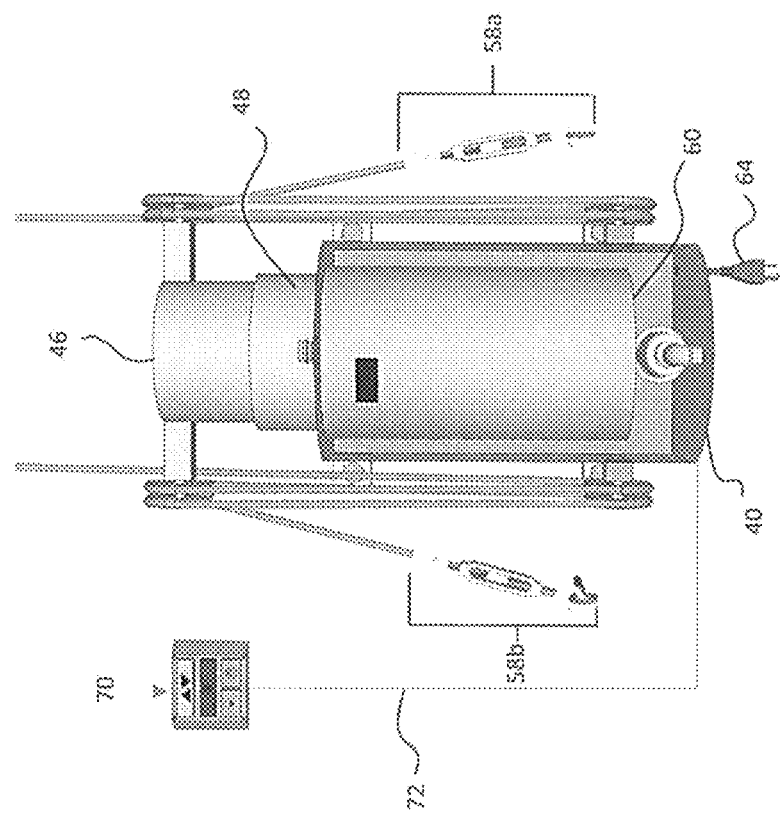
FIG. 13 is a sectional front view of an embodiment of the present invention showing the operation unit with a switch unit.

The cable ends 36' and 37' may be secured to the operation unit 32, as shown in FIG. 11. Alternatively, as shown in FIG. 13, the cable ends may be secured to another anchoring means 58a and 58b. The securing of the cable ends to the operation unit, an anchoring means, or any other securing of the cables, will cause the cable ends to be held in place so such that the cable ends will remain so secured while the cables are under tension and while the cables are not under tension, or while the cables are under a minimal amount of tension. A skilled reader will recognize that the anchoring means may be an eye/hook turnbuckle anchor that is attached to a surface. For example, as is shown in FIG. 14, an eye/hook turnbuckle anchor that incorporates an eye 55a, 55b to which the cable end is connected, the eye has a threaded end that is screwed into the turnbuckle 56a, 56b may be utilized as an anchoring means in an embodiment of the invention. The turnbuckle incorporates a threaded portion to receive the threaded end of the eye. The turnbuckle further incorporates a threaded section whereby a hook 54a, 54b is connectable to the turnbuckle. The hook may be attached to a wall eye 52a, 52b, as shown in FIG. 15, and that is attached to a surface to securely hold the cable in place in relation to the surface. A skilled reader will further recognize that the anchoring means may be any other anchoring means that will hold the cable ends in place. Moreover, the anchoring means applied to one cable end can differ from the anchoring means applied to the other cable end in embodiments of the present invention.

Fluid may be added to the receptacle through a receptacle inlet 50. The receptacle inlet may be a hole in the receptacle that is positioned above the highest level that the fluid may be filled to in the receptacle. The receptacle inlet may have a closure mechanism attached thereto, such as a cork, cap, a screw cap, or any other closure mechanism. The closure mechanism may function to prevent or reduce evaporation of the liquid in the receptacle. The closure mechanism may be opened while the fluid is added to the receptacle through the receptacle inlet, and may be otherwise closed in a secure manner whereby the fluid is held within the receptacle and the fluid cannot leak out through the receptacle inlet. The fluid can be poured into the receptacle, or otherwise added to the receptacle, through the receptacle inlet.

A fluid sensor 66 may be incorporated in some embodiments of the present invention. The fluid sensor may be utilized to sense the level of the fluid within the receptacle. For example, the fluid sensor may be activated to sense the level of the fluid when the door is closed. In other embodiments of the present invention the fluid sensor may be activated to undertake its sensing activities at regular intervals, at set times of the day, at intervals related to the progression of the opening and closing of the door, or at any other point in time that is set in the system.

Such sensing can be applied to a variety of purposes. For example, the fluid sensor may sense the level of fluid in the receptacle when the garage door is in a closed position and the telescoping section is collapsed. If the fluid level is below the sensor so that the sensor cannot sense any fluid, this indicates that the fluid level is below a preferred level while the door is closed. The present invention may be configured to indicate to a user through an alarm, a light incorporated in the operation unit, an electronic message sent to a mobile device, or other means that more fluid needs to be added to the receptacle. The fluid sensor may also be utilized to sense the level of fluid in the receptacle and to activate the fluid pump if fluid reaches a certain level or is above that level, or deactivate the pump if the fluid level does not reach a certain level and is below that level such that the fluid level cannot be sensed by the sensor. The fluid sensor are operable to activate or deactivate the fluid pump and therefore can control the height to which the door may be opened or the height the door may be moved to between an open and closed position. A skilled reader will recognize that one or more fluid sensors may be incorporated in embodiments of the present invention, and may be applied for a variety of purposes relating to the function of the operation unit.

A second fluid sensor, or a single long fluid sensor, could be utilized to sensor when the fluid level is too low for the present invention to function. The present invention may be configured to indicate to a user through an alarm, a light incorporated in the operation unit, an electronic message sent to a mobile device, or other means that more fluid needs to be added to the receptacle.

Sensors other than fluid sensors may also be incorporated into the present invention. For example, an embodiment of the present invention may incorporate a force sensor positioned in the path of the door that may prevent the door from closing upon an object, such as a vehicle, a bike, a person, or any other objection located in the path of the door. As another example, activation sensors may be incorporated in the present invention whereby the invention may be activated or deactivated from a distance. Such sensors may be activated to undertake its sensing activities at regular intervals, at set times of the day, at intervals related to the progression of the opening and closing of the door, or at any other point in time that is set in the system.

Figure 16:
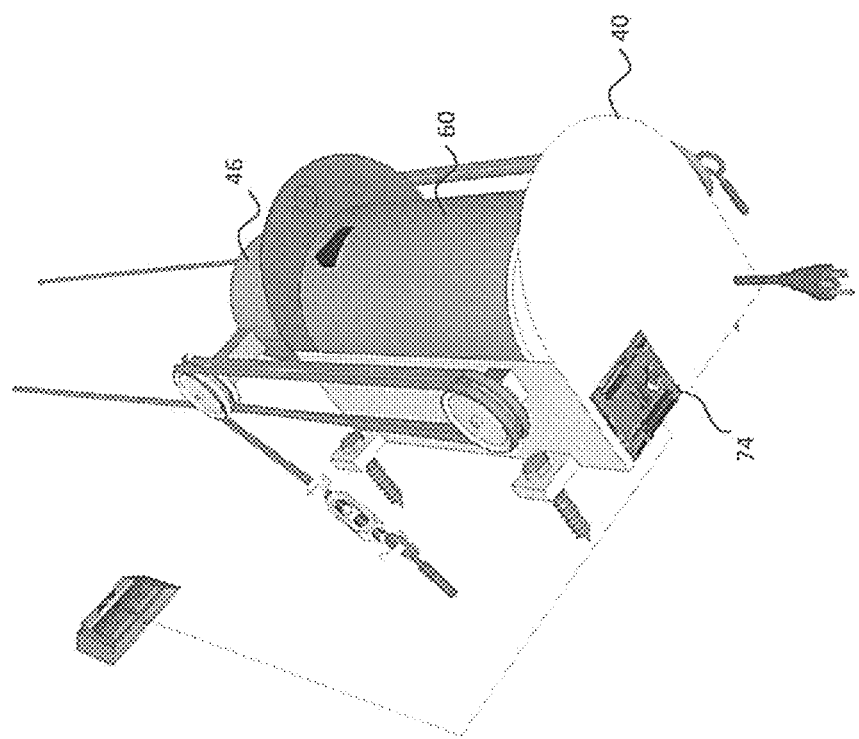
FIG. 16 is a sectional bottom perspective view of an embodiment of the present invention showing the operation unit attachable to a surface by multiple attachment means.

As shown in FIG. 13, some embodiments of the present invention may incorporate an activation panel 70 that provides manual buttons for operation of the present invention, such as: a start button whereby the operation unit will be activated to move the door into an open position from a closed position or a closed position from an open position, depending on the position of the door when the button is pushed; a stop button whereby the operation of the operation unit will be terminated and all movement of the door will cease when the button is pushed; and other buttons relating to the function of the present invention. The activation panel may be directly wired to the operation unit by a wire 72, such as to a motherboard 74. The operation unit may incorporate a motherboard 74 that is operable to control the function of the invention, as shown in FIG. 16. The motherboard may be wired to the activation panel 70. The motherboard 74 may further be operable to achieve remote activation, such as by a remote control unit that operates through a wireless signal, a command sent by electronic messaging such as a text, or other remote activation means.

The fluid pump of the present invention may be of various types. For example, the fluid pump may be an electric powered pump that may be connectable to an electric power source within the operation unit. For example, the operator unit electric power source may incorporate a plug 64 that can be connected to an electrical outlet to draw electric power, as shown in FIG. 13. The fluid pump may also be powered by other sources, such as battery powered, or solar powered, or by any other power source. A skilled reader will recognize that embodiments of the present invention may incorporate elements required to facilitate each of the possible types of power source that may be utilized by the present invention.

Figure 33:
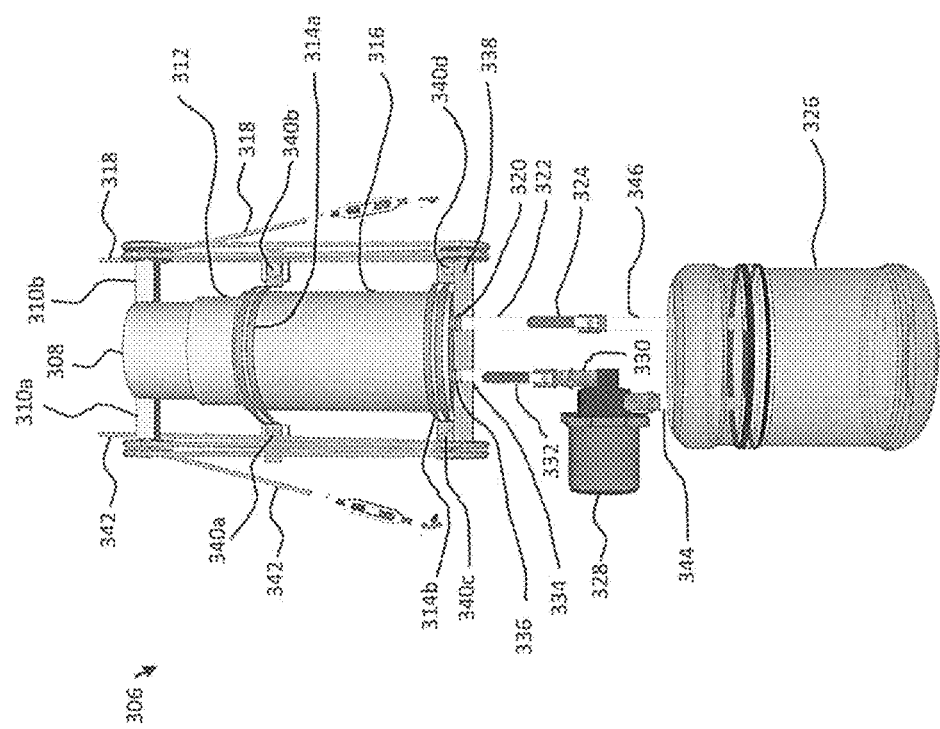
FIG. 33 is a front view of an embodiment of the present invention showing an operation unit with the pump external to the fluid receptacle.

Another embodiment of the present invention may incorporate an operation unit 306 that does not have either the telescoping section (comprising telescoping portions 308, 312 and 316) or the fluid pump 328 positioned within the receptacle 326, as shown in FIG. 33. The fluid pump is operable to pump fluid from the receptacle through an inflow conduit 344 that is attached to the fluid pump 326. The speed of the fluid pump will set the rate of the flow of the fluid into the inflow conduit and through the inflow conduit into the fluid pump.

The fluid pump operates to cause the fluid to pass from the fluid pump into a fluid conduit 330 that is below a pump valve 332. The fluid pump valve controls the rate of flow of the fluid through the fluid conduit into the inlet conduit 334 whereby the fluid flows through the telescoping section inlet port 336 into the lower telescoping portion 316 of the telescoping section. The fluid pump valve thereby sets the speed at which the door is opened. The greater the amount of fluid that flows from the fluid pump to the fluid pump connection conduit the faster the door will be opened. The smaller the amount of fluid that flows from the fluid pump to the fluid pump connection conduit the slower the door will be opened. Once a speed is set for opening the door, the position of the fluid pump valve should only be altered if the speed at which the door is opened is to be altered.

When fluid is pumped into the telescoping section the telescoping portions extend in the manner described herein. The expansion of the telescoping portions causes the telescoping arms 310a, 310b connected to the upper telescoping portion 308 to rise with the upper telescoping section as described herein. This creates tension on the cables 342, 318 that are connected to the door, and the door is thereby lifted in the manner described herein.

When the door is to be lowered the fluid will be released from the telescoping section through the telescoping section outlet port 320 into the outlet conduit 322. A release valve 324 is incorporated in the outlet conduit. The release valve can be positioned to control the rate of follow of the fluid from the outlet conduit 322 into the outflow conduit 346. The fluid flows from the outflow conduit into the receptacle 326. The rate of the flow of the fluid from the outlet conduit into the outflow conduit controls the speed at which the door is lowered. The faster the flow of the fluid from the outlet conduit into the outflow conduit the faster the speed at which the door will be lowered. The slower the flow of the fluid from the outlet conduit into the outflow conduit the slower the speed at which the door will be lowered.

In embodiments of the present invention, the fluid pump valve may control the rate of flow of fluid by widening or diminishing the size of an inlet conduit port connected to the pump valve through which the fluid must flow between the fluid conduit and the inlet conduit. A diminished size will cause less fluid to flow and the fluid to flow at a slower rate of speed. An augmented or wider size will cause more fluid to flow and the fluid to flow at a faster rate of speed.

In embodiments of the present invention, the release valve may control the rate of flow of fluid by widening or diminishing the size of an outlet conduit port connected to the release valve through which the fluid must flow between the outlet conduit and the outflow conduit. A diminished size will cause less fluid to flow and the fluid to flow at a slower rate of speed. An augmented or wider size will cause more fluid to flow and the fluid to flow at a faster rate of speed.

The cables may be attached to a surface in any of the manners described for the other embodiments of the present invention.

The telescoping section may be positioned to rest upon a support plate 338. The telescoping section may be attached to a surface, such as a wall, a ceiling or another surface, depending on the position of the operation unit, by two or more brackets 314a, 314b. Screws, bolts 340a, 340b, 340c, 340d or other connection means may be utilized to attach the brackets to the surface. The brackets are positioned around the front segment of the telescoping section. The brackets hold the weight of the telescoping section and the force upon the cables exerted by the upper and lower unit pulleys. The configuration of the present invention is such that the brackets are not required to hold the weight of the door.

In yet another embodiment of the present invention, as shown in FIG. 34, operation unit 400 may be configured such that the fluid pump 432 is positioned within the receptacle 430 and the telescoping section (comprising telescoping portions 406, 410, 412) is positioned to be external of the receptacle 430. The fluid pump is operable to pump fluid from the receptacle 430 into an inflow conduit 428 that is attached to the fluid pump 432. The speed of the fluid pump will set the rate of the flow of the fluid into the inflow conduit.

The fluid pump operates to cause the fluid to pass from the fluid pump through the inflow conduit 428 that is below a pump valve 426. The fluid pump valve controls the rate of flow of the fluid through the inflow conduit 428 into the inlet conduit 424 whereby the fluid flows through the telescoping section inlet port 420 into the lower telescoping portion 412 of the telescoping section. The fluid pump valve thereby sets the speed at which the door is opened. The greater the amount of fluid that flows from the fluid pump to the fluid pump connection conduit the faster the door will be lifted. The smaller the amount of fluid that flows from the fluid pump to the fluid pump connection conduit the slower the door will be lifted. Once a speed for opening the door is set, the position of the pump valve should only be altered if the speed at which the door is opened is to be altered.

When fluid is pumped into the telescoping section the telescoping portions extend in the manner described herein. The expansion of the telescoping portions causes the telescoping arms 408a, 408b connected to the upper telescoping portion 406 to rise with the upper telescoping section. This creates tension on the cables 402, 404 that are connected to the door, and the door is thereby lifted in the manner described herein.

When the door is to be lowered the fluid will be released from the telescoping section through the telescoping section outlet port 422 in to the outlet conduit 438. A release valve 436 is incorporated in the outlet conduit. The release valve can be positioned to control the rate of follow of the fluid from the outlet conduit 438 into the outflow conduit 434. The fluid flows from the outflow conduit into the receptacle 430. The rate of the flow of the fluid from the outlet conduit into the outflow conduit controls the speed at which the door is lowered. The faster the flow of the fluid from the outlet conduit into the outflow conduit the faster the speed at which the door will be lowered. The slower the flow of fluid from the outlet conduit into the outflow conduit the slower the speed at which the door will be lowered.

In embodiments of the present invention, the pump valve may control the rate of flow of fluid by widening or diminishing the size of an inlet conduit port connected to the pump valve through which the fluid must flow between the fluid conduit and the inlet conduit.

A diminished size will cause less fluid to flow and the fluid to flow at a slower rate of speed. An augmented or wider size will cause more fluid to flow and the fluid to flow at a faster rate of speed.

In embodiments of the present invention, the release valve may control the rate of flow of fluid by widening or diminishing the size of an outlet conduit port connected to the release valve through which the fluid must flow between the outlet conduit and the outflow conduit. A diminished size will cause less fluid to flow and the fluid to flow at a slower rate of speed. An augmented or wider size will cause more fluid to flow and the fluid to flow at a faster rate of speed.

The telescoping section may be positioned to rest upon a support plate 418. The telescoping section may be attached to a surface, such as a wall, a ceiling or another surface, depending on the position of the operation unit, by two or more brackets 414a, 414b. Screws, bolts 416a, 416b, 416c, 416d or other connection means may be utilized to attach the brackets to the surface. The brackets are positioned around the front segment of the telescoping section. The brackets hold the weight of the telescoping section and the force upon the cables exerted by the upper and lower unit pulleys. The configuration of the present invention is such that the brackets are not required to hold the weight of the door.

The cables may be attached to a surface in any of the manners described for the other embodiments of the present invention.

A skilled reader will recognize that a variety of upper side pulley and lower side pulley configurations are possible for embodiments of the present invention, as shown in FIGS. 23-27. The upper and lower side pulley configuration may be related to the fluid pump and door incorporated in the present invention. For example, a greater number of upper and/or lower unit pulleys may exert increased strain on the fluid pump than a lesser number of upper and/or lower unit pulleys, but a greater number of upper and/or lower unit pulleys can cause the invention to be able to life the weight of the door a farther distance. Thus, the type of door that is to be lifted and the capability of the fluid pump that is incorporated in the embodiment of the invention may directly affect the configuration of the upper and/or lower unit pulleys that are incorporated in the embodiment of the invention. FIG. 23 shows an embodiment of the present invention that incorporates an operation unit with each side having one-upper unit side pulley 120b, 120c and one-lower unit side pulley 120a, 120d. FIG. 24 shows an embodiment of the present invention that incorporates an operation unit with each side having one-upper unit side pulley 122b, 122c and two-lower unit side pulleys 122a, 122e, and 122d, 122f. FIG. 25 shows an embodiment of the present invention that incorporates an operation unit with each side having sets of two pulleys, namely upper unit pulleys 42b, 42f and 42c, 42g, and lower unit pulleys 42a, 42e and 42d, 42h. FIG. 26 shows an embodiment of the present invention that incorporates an operation unit with each side having two-upper unit side pulleys 126b, 126f and 126c, 126g and three-lower unit side pulleys 126a, 126e, 126i and 126d, 126h, 126j. FIG. 27 shows an embodiment of the present invention that incorporates an operation unit with each side having three-upper unit side pulleys 128b, 128f, 128j, and 128c, 128g, 128k and three-lower unit side pulleys 128a, 128e, 128i and 128d, 128h, 128l.

A skilled reader will recognize that the number of unit side pulleys incorporated in an operation unit will affect the distance a door is lifted in relation to the distance travelled by the cylinder. For example, an embodiment of the present invention having unit side pulleys such as shown in FIG. 23 (one upper and lower pulley on either side of the operation unit, known as a 2-to-1 pulley ratio) may be operable to lift a door to twice the distance travelled by the telescoping portions of the telescoping section. As another example, an embodiment of the present invention having unit side pulleys such as shown in FIG. 25 (two upper and lower pulleys on either side of the operation unit, known as a 4-to-1 pulley ratio) may be operable to lift a door to four times the distance travelled by the telescoping portions of the telescoping section. As yet another example, an embodiment of the present invention having unit side pulleys such as shown in FIG. 27 (three upper and lower pulleys on either side of the operation unit, known as a 6-to-1 pulley ratio) may be operable to lift a door to six times the distance travelled by the telescoping portions of the telescoping section. A skilled reader will recognize how the unit side pulley configuration can affect the height of the door that embodiments of the present invention are operable to lift.

As shown in FIGS. 29-32, embodiments of the present invention can incorporate telescoping sections that incorporate different numbers of telescoping portions. As shown in FIG. 29, a telescoping section incorporated in an embodiment of the present invention can incorporate a lower telescoping portion 60, a middle telescoping portion 48 and an upper telescoping portion 46. As shown in FIG. 30, a telescoping section incorporated in an embodiment of the present invention can incorporate a lower telescoping portion 60, a middle telescoping portion 48, a third telescoping section 300, and an upper telescoping portion 46. As shown in FIG. 31, a telescoping section incorporated in an embodiment of the present invention can incorporate a lower telescoping portion 60, a middle telescoping portion 48, a third telescoping portion 300, a fourth telescoping portion 302, and an upper telescoping portion 46. As shown in FIG. 32, a telescoping section incorporated in an embodiment of the present invention can incorporate a lower telescoping portion 60, a middle telescoping portion 48, a third telescoping portion 300, a fourth telescoping portion 302, a fifth telescoping portion 304, and an upper telescoping portion 46. A skilled reader will recognize that a telescoping section incorporated in an embodiment of the present invention can have any number of telescoping portions.

The number of telescoping portions incorporated in a telescoping section have a direct effect upon the height to which a garage door can be lifted. A garage door will be lifted to a height that is relational in value to the distance a telescoping portion is extended. For example, in one embodiment of the present invention that incorporates three telescoping portions and each side of the operation unit has sets of two pulleys (as shown in FIGS. 25, 13 and 33) the garage door may be lifted four inches from the ground for each one inch that a telescoping portion of the telescoping section extends. Moreover, to lift a garage door of a height of seven feet telescoping portions equal to twenty one inches in length may be required. This is just an example of one embodiment of the present invention.

Different configurations of unit side pulleys and varying heights and numbers of telescoping sections can be incorporated in embodiments of the present invention to lift doors of varying heights.

Thus, through the configuration of the telescoping section incorporated in embodiments of the present invention, doors of various heights can be lifted by telescoping sections having varying number of telescoping portions. Doors that are of a great height, such as the doors to mechanic shops, airplane hanger doors, entrance doors to public attractions, and other doors of a significant height, may be lifted by embodiments of the present invention that incorporate telescoping sections that comprise multiple telescoping sections, such as shown in FIGS. 31 and 32. Whereas, doors of a lesser height, such as residential garage doors, and other doors of a lesser height may be lifted by embodiments of the present invention that incorporate telescoping sections that comprise fewer telescoping sections, such as shown in FIGS. 29 and 30.

The number of telescoping portions incorporated in a telescoping section may also be configured in accordance with the overall size of the operation unit. If the operation unit should be of an overall small size when the telescoping section is collapsed then more telescoping portions may be included in a telescoping section to raise a door. This is because if the operation unit is to be of a small size when the telescoping section is collapsed it may require more telescoping portions to lift a door to a particular height. For example, to lift a door of seven feet telescoping portions of lengths that are collectively equal to twenty one inches may be required in some embodiments of the present invention. The number of telescoping portions required to collectively equal twenty one inches will depend on whether the telescoping portions are three telescoping portions each seven inches in length, or whether the telescoping portions are five telescoping portions each five inches in length. As the telescoping portions nest within each other when the telescoping section is collapsed, the height of the operation unit that incorporates the telescoping section will be directly affected by the length of each of the telescoping portions. Longer telescoping portions may cause the operation unit to have a greater height than an operation unit that incorporates a telescoping section with telescoping portions that are shorter (less long).

A skilled reader will recognize that the ultimate height of the operation unit will depend on the configuration of the elements of the operation unit. As an example, as shown in FIGS. 13 and 33, different embodiments of the present invention can affect the height of the operation unit, for example, if the telescoping section is positioned within the receptacle (as shown in FIG. 13) the overall height of the operation unit may be less than if the telescoping section is positioned externally to the receptacle (as shown in FIG. 33.

A skilled reader will recognize that the configuration of multiple elements affect the function of embodiments of the present invention. For example, both of the following individually and collectively affect the height to which a door can be lifted by an embodiment of the present invention: (i) the collective length of the telescoping portions; and (ii) the number of unit side pulleys in an operation unit. Therefore, the configuration of such elements in embodiments of the present invention must be considered in isolation as well as in regards to collective application, in light of the height of the door that the embodiment of the present invention is to be utilized to lift, and the operation of the elements to achieve the required lifting.

The strength of the fluid pump is another consideration for the function of the present invention. A stronger fluid pump can be utilized with heavier doors. However, embodiments of the present invention can incorporate off-the-shelf pumps, which can be cost-effective. A fluid pump may be modified in accordance with the present invention such that the connection port or a fluid pump connector portion can be sized to diminish the size of the input hole into the fluid pump, and thereby reduce the strength of the fluid pump by reducing the amount of water that can flow into the fluid pump. The power that the fluid pump functions at is also reduced by such a modification of elements of the present invention. These elements that cause the strength of the fluid pump to be adjusted make the present invention cost-effective to produce.

The telescoping section, including each of the telescoping portions may be formed through three-dimensional printing in some embodiments of the present invention. This offers a benefit over the prior art systems, in that a telescoping section can be specifically configured and formed for a particular embodiment of the present invention and it can be created at a lower cost than is required to custom produce the telescoping section through other processes. This in turn helps custom embodiments of the present invention formed for use with specific doors to be affordable.

It will be appreciated by those skilled in the art that other variations of the embodiments described herein may also be practiced without departing from the scope of the invention. Other modifications are therefore possible. For example, the embodiments of the present invention can be utilized to lift items other than doors that can be lifted by cables and pulleys.

We claim:

1. A door opener operable to move a door between an open and closed position, said door opener comprising:
   a. two or more cables configured to be connected to the door;
   b. an opener unit comprising:
      i. a receptacle having fluid therein;
      ii. a telescoping section comprising two or more telescoping portions positioned at least partially within the receptacle;
      iii. a fluid pump having an inlet/outlet port being connected to the telescoping section via a connection port; and
      iv. a plurality of unit pulleys attached to either side of an uppermost telescoping portion of the telescoping section and to either side of the receptacle having the cables each wrapped around and between said unit pulleys on opposite sides; and
   c. a positioning system whereby the cables are configured to be positioned along a path between the door and the opener; and
   whereby the door is moved towards an open position when the fluid pump pumps the fluid from the receptacle to the telescoping section and the telescoping portions extend; and
   whereby the door is moved towards a closed position when the fluid pump is not in operation and fluid flows from the telescoping section to the receptacle and the telescoping portions collapse.

2. The door opener of claim 1, further comprises a stopper mechanism incorporated in the fluid pump whereby the fluid may be prevented from flowing in any direction between the receptacle and the telescoping section when the door is to be held in a stationary position.

3. The door opener of claim 1, further comprising one or more positioning pulleys being incorporated in the positioning system along a path between the opener unit and the door for each of the cables whereby the cables are each extended between one or more positioning pulleys and partially around one or more positioning pulleys in said path.

4. The door opener of claim 1, further comprising the telescoping section incorporating:
   a. a lower telescoping portion having one end sealed by a covering member and an open end; and
   b. at least one additional telescoping portion disposed within the open end of the said lower telescoping portion such that there is an overlap between said telescoping portions; and
   whereby forcing the fluid into said telescoping section causes said at least one additional telescoping portion to extend relative to said lower telescoping portion.

5. The door opener of claim 1, further comprising the plurality of unit pulley incorporating:
   a. on each opposite outer side of the receptacle one or more lower unit pulleys attached to the outer side of the receptacle; and
   b. on each opposite outer side of the uppermost telescoping portion of the telescoping section one or more upper unit pulleys attached to the outer side of said telescoping portion; and
   wherein each of the cables is partially wound around and extends between the one or more lower unit pulleys and the one or more upper unit pulleys on opposite sides of the opener unit; and
   wherein as the telescoping section extends tension is exerted on the cables and more length of cable is required to extend between the one or more upper unit pulleys and the one or more lower unit pulleys and the length of cable extending between the door and the opener unit is diminished; and
   wherein as the telescoping section collapses tension is diminished on the cables and less length of cable is required to extend between the one or more upper unit pulleys and the one or more lower unit pulleys and the length of cable extending between the door and the opener unit is increased.

6. The door opener of claim 1, further comprising an attachment whereby the opener unit is held proximate to a surface, said attachment comprising any of: a brace that encompasses the opener unit and attaches to the surface; a plate attached to the opener unit that is attachable to a surface; or one or more attachment sections that are each attached to portions of the opener unit and each attachment section being attachable to a surface.

7. The door opener of claim 6, wherein (a) the surface that the opener unit is held proximate to by the attachment is any of the following surfaces: a surface on virtually the same plane as the door; a surface that is a ceiling; a surface that is a floor; or a surface that is on a different plane from the door; (b) the opener unit is attached to a surface that is any of the following: above the door, below the door, or to either side of the door; and (c) the opener unit is positioned indoors or outdoors.

8. The door opener of claim 1, wherein the fluid pump incorporates one or more valves operable to control the flow of fluid between the telescoping section and the receptacle.

9. The door opener of claim 1, further comprising a motherboard attached to the opener unit whereby the opener unit can be operated remotely.

10. A door opener operable to move a door between an open and closed position, said door opener comprising:
   a. two or more cables configured to be connected to the door;
   b. a receptacle having fluid therein;
   c. a telescoping section comprising two or more telescoping portions;
   d. a fluid pump having an inlet port and an outlet port being connected to the telescoping section via one or more connection ports;
   e. a plurality of unit pulleys attached to either side of an uppermost telescoping portion of the telescoping section and a base telescoping portion of the telescoping section having the cables each wrapped around and between said unit pulleys on opposite sides; and
   f. a positioning system whereby the cables are configured to be positioned along a path between the door and the opener; and whereby the door is moved towards an open position when the fluid pump pumps the fluid from the receptacle to the telescoping section and the telescoping portions extend; and whereby the door is moved towards a closed position when the fluid pump is not in operation and fluid flows from the telescoping section to the receptacle and the telescoping portions collapse.

11. The door opener of claim 10, further comprises a stopper mechanism incorporated in the fluid pump whereby the fluid may be prevented from flowing in any direction between the receptacle and the telescoping section when the door is to be held in a stationary position.

12. The door opener of claim 10, further comprising one or more positioning pulleys being incorporated in the positioning system along a path between the opener unit and the door for each of the cables whereby the cables are each extended between one or more positioning pulleys and partially around one or more positioning pulleys in said path.

13. The door opener of claim 10, further comprising the telescoping section incorporating:
   a. a lower telescoping portion having one end sealed by a covering member and an open end; and
   b. at least one additional telescoping portion disposed within the open end of the said lower telescoping portion such that there is an overlap between said telescoping portions; and
   whereby forcing the fluid into said telescoping section causes said at least one additional telescoping portion to extend relative to said lower telescoping portion.

14. The door opener of claim 10, further comprising the plurality of unit pulley incorporating:
   a. on each opposite outer side of the receptacle one or more lower unit pulleys attached to the outer side of the receptacle; and
   b. on each opposite outer side of the uppermost telescoping portion of the telescoping section one or more upper unit pulleys attached to the outer side of said telescoping portion; and
   wherein each of the cables is partially wound around and extends between the one or more lower unit pulleys and the one or more upper unit pulleys on opposite sides of the opener unit; and
   wherein as the telescoping section extends tension is exerted on the cables and more length of cable is required to extend between the one or more upper unit pulleys and the one or more lower unit pulleys and the length of cable extending between the door and the opener unit is diminished; and
   wherein as the telescoping section collapses tension is diminished on the cables and less length of cable is required to extend between the one or more upper unit pulleys and the one or more lower unit pulleys and the length of cable extending between the door and the opener unit is increased.

15. The door opener of claim 10, further comprising the one or more connection ports including a telescoping unit inlet port and a telescoping unit outlet port, an inlet conduit extending between the inlet port and the telescoping unit inlet port and an outlet conduit extending between the outlet port and the telescoping outlet port, the inlet conduit and outlet conduit are configured so that fluid can flow therein, the inlet conduit having an inlet valve therein whereby the fluid flow in the inlet conduit can be controlled and the outlet conduit having an outlet valve therein whereby the fluid flow in the outlet conduit can be controlled.

16. The door opener of claim 10, further comprising the ends of the cables that are not attached to the door being each attached to one of two anchors that are secured to a surface near the receptacle.

17. A door opener operable unit connectable to a door, said door opener unit comprising:
   a. a receptacle having fluid therein;
   b. a telescoping section comprising two or more telescoping portions;
   c. a fluid pump having an inlet/outlet port being connected to the telescoping section via a connection port, said fluid pump being positioned within the receptacle; and
   d. a plurality of unit pulleys attached to either side of an uppermost telescoping portion of the telescoping section configured so that cables are wrap-able around and between said unit pulleys on opposite sides;
   whereby the fluid pump is operable to pump the fluid from the receptacle to the telescoping section causing the telescoping portions to extend; and
   whereby when fluid flows from the telescoping section to the receptacle the telescoping portions collapse.

18. The door opener unit of claim 17, further comprises a stopper mechanism incorporated in the fluid pump whereby the fluid may be prevented from flowing in any direction between the receptacle and the telescoping section when the door is to be held in a stationary position.

19. The door opener unit of claim 17, further comprising the telescoping section incorporating:
   a. a lower telescoping portion having one end sealed by a covering member and an open end; and
   b. at least one additional telescoping portion disposed within the open end of the said lower telescoping portion such that there is an overlap between said telescoping portions; and
   whereby forcing the fluid into said telescoping section causes said at least one additional telescoping portion to extend relative to said lower telescoping portion.

20. The door opener unit of claim 17, further comprising the fluid pump incorporated one or more valves operable to control the flow of fluid between the telescoping section and the receptacle.

* * * * *